US012468255B2

(12) United States Patent
Iwashita et al.

(10) Patent No.: US 12,468,255 B2
(45) **Date of Patent: *Nov. 11, 2025**

(54) ELECTROPHOTOGRAPHIC PHOTOSENSITIVE MEMBER, PROCESS CARTRIDGE, AND IMAGE FORMING APPARATUS

(71) Applicant: KYOCERA Document Solutions Inc., Osaka (JP)

(72) Inventors: Yuko Iwashita, Osaka (JP); Jun Azuma, Osaka (JP); Keiji Maruo, Osaka (JP); Kazuaki Ezure, Osaka (JP); Yuichi Yoshida, Osaka (JP); Kazutaka Sugimoto, Osaka (JP); Yasuhiro Oishi, Osaka (JP); Kazunari Hamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,961

(22) Filed: Apr. 16, 2024

(65) Prior Publication Data

US 2024/0353792 A1 Oct. 24, 2024

(30) Foreign Application Priority Data

Apr. 18, 2023 (JP) ................................ 2023-067705

(51) Int. Cl.
*G03G 21/18* (2006.01)
*G03G 5/14* (2006.01)
(Continued)

(52) U.S. Cl.
CPC ......... *G03G 21/1814* (2013.01); *G03G 5/142* (2013.01); *G03G 7/0053* (2013.01); *G03G 15/095* (2013.01); *G03G 2215/00957* (2013.01)

(58) Field of Classification Search
CPC .. G03G 21/1814; G03G 5/142; G03G 7/0053; G03G 15/095; G03G 2215/00957; G03G 15/751; G03G 15/75
See application file for complete search history.

(56) References Cited

U.S. PATENT DOCUMENTS 9,753,384 B2 9/2017 Kurimoto et al.
2008/0050666 A1* 2/2008 Otsubo ............... G03G 15/751 430/65

(Continued)

FOREIGN PATENT DOCUMENTS

JP 2016-212400 A 12/2016

*Primary Examiner* — Sandra Brase
(74) *Attorney, Agent, or Firm* — Studebaker Brackett PLLC

(57) ABSTRACT

An electrophotographic photosensitive member includes a conductive substrate, an intermediate layer provided on the conductive substrate, and a photosensitive layer provided on the intermediate layer. The intermediate layer contains a specific polyamide resin and specific inorganic particles. The specific inorganic particles each include a metal oxide particle and a surface treatment layer covering at least a part of the surface of the metal oxide particle. The surface treatment layers contain a component derived from an organic siloxane compound and at least one of aluminum oxide and silica. The specific polyamide resin includes a first repeating unit derived from an aliphatic dicarboxylic acid with a carbon number of at least 8 and no greater than 20 and a second repeating unit derived from a diamine compound with a cycloalkane structure.

13 Claims, 4 Drawing Sheets

(51) Int. Cl.
*G03G 7/00* (2006.01)
*G03G 15/095* (2006.01)

(56) References Cited

U.S. PATENT DOCUMENTS

2024/0353771 A1* 10/2024 Iwashita ................ G03G 15/75
2024/0353772 A1* 10/2024 Iwashita ................ G03G 5/142

* cited by examiner

ELECTROPHOTOGRAPHIC PHOTOSENSITIVE MEMBER, PROCESS CARTRIDGE, AND IMAGE FORMING APPARATUS

INCORPORATION BY REFERENCE

The present application claims priority under 35 U.S.C. § 119 to Japanese Patent Application No. 2023-067705, filed on Apr. 18, 2023. The contents of this application are incorporated herein by reference in their entirety.

BACKGROUND

The present disclosure relates to an electrophotographic photosensitive member, a process cartridge, and an image forming apparatus.

Electrophotographic photosensitive members are required to maintain a certain level of sensitivity independent of the environment and be able to form images with less fog even in high-temperature and high-humidity environments. An electrophotographic photosensitive member includes a conductive substrate, an intermediate layer provided on the conductive substrate, and a photosensitive layer provided on the intermediate layer, for example. The intermediate layer contains a binder resin and metal oxide particles, for example. The intermediate layer has the role of increasing adhesion between the conductive substrate and the photosensitive layer and of inhibiting charge injection from the conductive substrate side to the photosensitive layer side. As an electrophotographic photosensitive member including such an intermediate layer, an electrophotographic photosensitive member is proposed that includes an intermediate layer with a specific property containing metal oxide particles, for example.

SUMMARY

An electrophotographic photosensitive member according to an aspect of the present disclosure is an electrophotographic photosensitive member including a conductive substrate, an intermediate layer provided on the conductive substrate, and a photosensitive layer provided on the intermediate layer. The intermediate layer contains a specific polyamide resin and specific inorganic particles. The specific inorganic particles each include a metal oxide particle and a surface treatment layer covering at least a part of a surface of the metal oxide particle. The surface treatment layers contain a component derived from an organic siloxane compound and at least one of aluminum oxide and silica. The specific polyamide resin includes a first repeating unit derived from an aliphatic dicarboxylic acid with a carbon number of at least 8 and no greater than 20 and a second repeating unit derived from a diamine compound with a cycloalkane structure. A total percentage content of the first repeating unit and the second repeating unit to all repeating units included in the specific polyamide resin is at least 80% by mol.

A process cartridge according to an aspect of the present disclosure includes the aforementioned electrophotographic photosensitive member.

An image forming apparatus according to an aspect of the present disclosure includes an image bearing member, a charger that charges a surface of the image bearing member, a light exposure device that exposes the charged surface of the image bearing member to light to form an electrostatic latent image on the surface of the image bearing member, a development device that develops the electrostatic latent image into a toner image by supplying toner to the surface of the image bearing member, and a transfer device that transfers the toner image from the image bearing member to a transfer target.

The image bearing member is the aforementioned electrophotographic photosensitive member.

DETAILED DESCRIPTION

Figure 1:
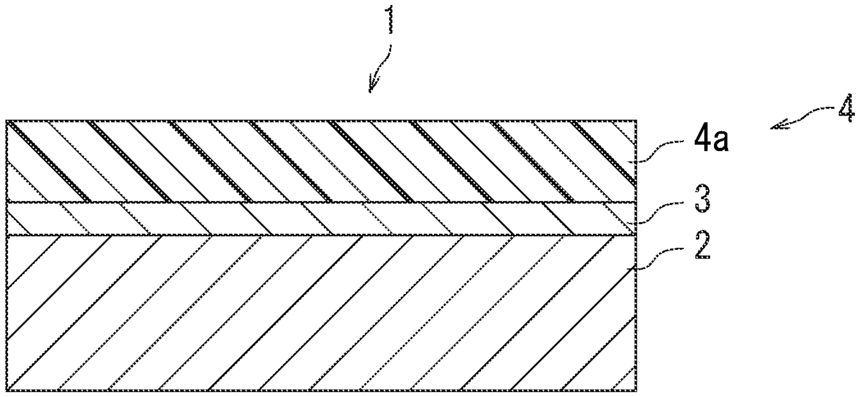
FIG. 1 is a partial cross-sectional view of a single-layer electrophotographic photosensitive member being an example of an electrophotographic photosensitive member of a first embodiment of the present disclosure.

The following describes embodiments of the present disclosure in detail. However, the present disclosure is not limited to the following embodiments and can be practiced with alterations made as appropriate within a scope of objects of the present disclosure.

The term "(meth)acryl" is used as a generic term for both acryl and methacryl. The term "(meth)acrylate" is used as a generic term for both acrylate and methacrylate. Unless otherwise stated, the number average particle diameter of a powder is a number average value of equivalent circle diameters (Heywood diameters: diameters of circles having the same areas as projected areas of the primary particles) of primary particles of the powder as measured using a scanning electron microscope. The number average primary particle diameter is a number average value of equivalent circle diameters of 100 primary particles, for example. In the following description, the term "-based" may be appended to the name of a chemical compound to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof. The terms "general formula" and "chemical formula" are collectively referred to as "formula." The phrase "each represent, independently of one another," in description about formulas means possibly representing the same group or different groups. Unless otherwise stated, one type of each component described in the present specification may be used independently or two or more types of the component may be used in combination. For example, the phrases "at least one among A, B, and C" and "at least one of A, B, and C" are defined the same as the phrase "at least one selected from the group consisting of A, B, and C."

First Embodiment: Electrophotographic Photosensitive Member

A first embodiment of the present disclosure relates to an electrophotographic photosensitive member (also referred to below as photosensitive member). An electrophotographic photosensitive member of the first embodiment includes a conductive substrate, an intermediate layer provided on the conductive substrate, and a photosensitive layer provided on the intermediate layer. The intermediate layer contains a specific polyamide resin and specific inorganic particles. The specific inorganic particles each include a metal oxide particle and a surface treatment layer covering at least a part of the surface of the metal oxide particle. The surface treatment layers contain a component derived from an organic siloxane compound and at least one of aluminum oxide and silica. The specific polyamide resin includes a first repeating unit derived from an aliphatic dicarboxylic acid with a carbon number of at least 8 and no greater than 20 and a second repeating unit derived from a diamine compound with a cycloalkane structure. The total percentage content of the first repeating unit and the second repeating unit to all repeating units included in the specific polyamide resin is at least 80% by mol.

As a result of having the above features, the photosensitive member of the first embodiment can exhibit sensitivity with reduced environmental dependence and inhibit occurrence of fogging in high-temperature and high-humidity environments. The reasons therefor can be inferred as follows. The intermediate layer included in the photosensitive member of the first embodiment contains the specific inorganic particles. The specific inorganic particles each include a metal oxide particle and a surface treatment layer. The surface treatment layers contain a component derived from an organic siloxane compound and at least one of aluminum oxide and silica. As a result of including the surface treatment layers, the specific inorganic particles have excellent dispersion stability in a solution (solution for intermediate layer formation) used in formation of the intermediate layer. The specific inorganic particles have high affinity with the specific polyamide resin being a binder resin of the intermediate layer. As a result, the specific inorganic particles are highly dispersed in the specific polyamide resin in the intermediate layer formed with the aforementioned solution for intermediate layer formation. The photosensitive member of the first embodiment includes the intermediate layer in which the specific inorganic particles are highly dispersed in the polyamide resin, thereby optimizing effects derived from the intermediate layer.

Furthermore, intermediate layers of known photosensitive members, which can exhibit excellent insulation properties in normal-temperature and normal-humidity environments, absorb moisture in high-temperature and high-humidity environments. This absorption leads to a decrease in resistance, which easily causes leakage current. Therefore, resistance of the intermediate layers included in known photosensitive members may be extremely reduced in high-temperature and high-humidity environments, leading to the intermediate layers exhibiting insufficient functions. The metal oxide particles subjected to surface treatment with only an organic siloxane compound tend to further reduce resistance of the intermediate layer. By contrast, the intermediate layer included in the photosensitive member of the first embodiment contains the specific inorganic particles. The specific polyamide resin has at least a certain percentage content of the first repeating unit and the second repeating unit, which are highly hydrophobic repeating units, so the molecule is highly hydrophobic as a whole. The intermediate layer containing the specific polyamide resin hardly absorbs moisture even in high-temperature and high-humidity environments. In addition, the specific inorganic particles used in the photosensitive member of the first embodiment are subjected to surface treatment with not only the organic siloxane compound but also aluminum oxide or silica. Therefore, the specific inorganic particles do not significantly reduce resistance of the intermediate layer. As a result of containing the specific polyamide resin and the specific inorganic particles, the intermediate layer included in the photosensitive member of the first embodiment can maintain a sufficient level of resistance even in high-temperature and high-humidity environments. Typical characteristics of polyamide resins are that they can be produced from only a diamine and a dicarboxylic acid, achieving stable quality. As a result, the photosensitive member of the first embodiment can exhibit sensitivity with reduced environmental dependence and inhibit occurrence of fogging in high-temperature and high-humidity environments. The photosensitive member is further described below.

The photosensitive member of the first embodiment is a single-layer electrophotographic photosensitive member (also referred to below as a single-layer photosensitive member") or a multi-layer electrophotographic photosensitive member (also referred to below as a multi-layer photosensitive member), for example. The single-layer photosensitive member is a negatively chargeable single-layer photosensitive member, for example. The multi-layer photosensitive member is a positively chargeable multi-layer photosensitive member, for example.

The configuration of a single-layer photosensitive member 1, which is an example of the photosensitive member of the first embodiment, is described below with reference to FIG. 1. FIG. 1 is a partial cross-sectional view of the single-layer photosensitive member 1. As illustrated in FIG. 1, the single-layer photosensitive member 1 includes a conductive substrate 2, an intermediate layer 3 provided on the conductive substrate 2, and a photosensitive layer 4 provided on the intermediate layer 3, for example. The photosensitive layer 4 is a photosensitive layer (also referred to below as single-layer photosensitive layer) 4*a* made up of a single layer.

The intermediate layer 3 has a thickness of preferably at least 1 μm and no greater than 20 μm, and more preferably at least 1 μm and no greater than 10 μm.

The thickness of the single-layer photosensitive layer 4*a* is not limited particularly, and is preferably at least 5 μm and no greater than 100 μm, and more preferably at least 10 μm and no greater than 50 μm. The configuration of the single-layer photosensitive member 1 being an example of the photosensitive member of the first embodiment has been described so far with reference to FIG. 1.

Figure 2:
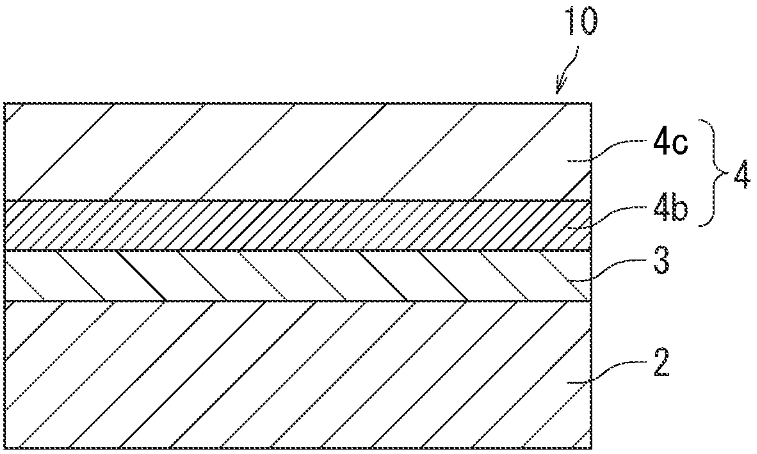
FIG. 2 is a partial cross-sectional view of a multi-layer electrophotographic photosensitive member being an example of the electrophotographic photosensitive member of the first embodiment of the present disclosure.

The configuration of a multi-layer photosensitive member 10, which is another example of the photosensitive member of the first embodiment, is described below with reference to FIG. 2. FIG. 2 is a partial cross-sectional view of the multi-layer photosensitive member 10. As illustrated in FIG. 2, the multi-layer photosensitive member 10 includes a conductive substrate 2, an intermediate layer 3 provided on the conductive substrate 2, and a photosensitive layer 4 provided on the intermediate layer 3, for example. The photosensitive layer 4 includes a charge generating layer 4*b* and a charge transport layer 4*c*. More specifically, the multi-layer photosensitive member 10 illustrated in FIG. 2 includes a conductive substrate 2, an intermediate layer 3 provided on the conductive substrate 2, a charge generating layer 4*b* provided on the intermediate layer 3, and a charge transport layer 4*c* provided on the charge generating layer 4*b*.

The intermediate layer 3 included in the multi-layer photosensitive member 10 is the same as the intermediate layer 3 included in the single-layer photosensitive member 1, and description thereof is therefore omitted.

The thickness of the charge generating layer 4*b* is not limited particularly and is preferably at least 0.01 μm and no greater than 5 μm, and more preferably at least 0.1 μm and no greater than 3 μm. In the example illustrated in FIG. 2, the charge generating layer 4*b* has a single-layer structure. However, the charge generating layer 4*b* may have a multiplayer structure.

The thickness of the charge transport layer 4*c* is not limited particularly and is preferably at least 2 μm and no greater than 100 μm, and more preferably at least 5 μm and no greater than 50 μm. In the example illustrated in FIG. 2, the charge transport layer 4*c* has a single-layer structure. However, the charge transport layer 4*c* may have a multiplayer structure. The configuration of the multi-layer photosensitive member 10 being an example of the photosensitive member of the first embodiment has been described so far with reference to FIG. 2.

However, the structure of the photosensitive member of the first embodiment may differ from those illustrated in FIGS. 1 and 2. For example, the photosensitive member of the first embodiment may further include another layer (e.g., a protective layer provided on the photosensitive layer) in addition to the conductive substrate, the intermediate layer, and the photosensitive layer. When the photosensitive member of the first embodiment is a multi-layer photosensitive member, the multi-layer photosensitive member may include the conductive substrate, the intermediate layer provided on the conductive substrate, the charge transport layer provided on the intermediate layer, and the charge generating layer provided on the charge transport layer.

[Intermediate Layer]

The intermediate layer contains a specific polyamide resin and specific inorganic particles. Presence of the intermediate layer can allow smooth flow of electric current generated during light exposure on the photosensitive member of the first embodiment while maintaining insulation properties to such an extent that occurrence of leakage can be inhibited, thereby suppressing an increase in resistance. The intermediate layer preferably contains only the specific polyamide resin and the specific inorganic particles. Specifically, the total percentage content of the specific polyamide resin and the specific inorganic particles is preferably at least 90% by mass in the intermediate layer, more preferably at least 99% by mass, and further preferably 100% by mass.

(Specific Polyamide Resin)

The specific polyamide resin includes a first repeating unit derived from an aliphatic dicarboxylic acid with a carbon number of at least 8 and no greater than 20 and a second repeating unit derived from a diamine compound with a cycloalkane structure. The total percentage content of the first repeating unit and the second repeating unit to all repeating units included in the specific polyamide resin is at least 80% by mol, preferably at least 95% by mole, and more preferably 100% by mol.

The respective numbers of types of the first repeating unit and the second repeating unit included in the specific polyamide resin may be one or two or more. The specific polyamide resin preferably includes one type of first repeating unit and one type of second repeating unit.

The aliphatic dicarboxylic acid with a carbon number of at least 8 and no greater than 20 is represented by general formula "COOH—$(CH_2)$n-COOH" (where n is an integer of at least 6 and no greater than 18), for example. Examples of the aliphatic dicarboxylic acid with a carbon number of at least 8 and no greater than 20 include octanedioic acid, nonanedioic acid, decanedioic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, and eicosane diacid. The aliphatic dicarboxylic acid with a carbon number of at least 8 and no greater than 20 is preferably an aliphatic dicarboxylic acid with a carbon number of at least 8 and no greater than 15, more preferably an aliphatic dicarboxylic acid with a carbon number of at least 8 and no greater than 12, and further preferably octanedioic acid, decanedioic acid, or dodecanedioic acid.

Examples of the cycloalkane structure of the diamine compound with a cycloalkane structure include a cyclopentane structure, a cyclohexane structure, a cycloheptane structure, a cyclooctane structure, a bicyclopentane structure, and a decalin structure. Examples of the diamine compound with a cycloalkane structure include 1,2-cyclopentanediamine, 1,3-cyclopentanediamine, 1,2-cyclohexanediamine, 1,3-cyclohexanediamine, 1,4-cyclohexanediamine, isophoronediamine, 4,4-methylenebis-2-methylcyclohexylamine, 2,5-bis(aminomethyl)bicyclo[2,2,1]heptane, and 2,6-bis(aminomethyl)bicyclo[2,2,1]heptane. The diamine compound with a cycloalkane structure is preferably isophoronediamine or 4,4-methylenebis-2-methylcyclohexylamine, and more preferably isophoronediamine.

The specific polyamide resin may, in small amounts, include other repeating units (e.g., a repeating unit derived from a lactam compound and a repeating unit derived from an aliphatic dicarboxylic acid with a carbon number of less than 8) in addition to the first repeating unit and the second repeating unit. However, the specific polyamide resin preferably does not include a repeating unit derived from an aromatic dicarboxylic acid. Specifically, the percentage content of the repeating unit derived from an aromatic dicarboxylic acid to all repeating units included in the specific polyamide resin is preferably no greater than 5% by mol, more preferably no greater than 1% by mol, and further preferably 0% by mol.

The specific polyamide resin has a percentage content of preferably at least 10% by mass and no greater than 70% by mass in the intermediate layer, and more preferably at least 20% by mass and no greater than 50% by mass. As a result of the percentage content of the specific polyamide resin being set to at least 10% by mass and no greater than 70% by mass, the specific polyamide resin can easily function as a binder resin of the intermediate layer.

(Specific Inorganic Particles)

The specific inorganic particles each include a metal oxide particle and a surface treatment layer covering at least a part of the surface of the metal oxide particle. The specific inorganic particles have a number average primary particle diameter of preferably at least 5 nm and no greater than 100 nm, more preferably at least 8 nm and no greater than 50 nm, and further preferably at least 8 nm and no greater than 20 nm.

The specific inorganic particles have a content of preferably at least 50 parts by mass and no greater than 1000 parts by mass relative to 100 parts by mass of the specific polyamide resin in the intermediate layer, and more preferably at least 100 parts by mass and no greater than 500 parts by mass. As a result of the content of the specific inorganic particles being set to at least 50 parts by mass and no greater than 1000 parts by mass, the intermediate layer can further effectively function to increase adhesion between the conductive substrate and the photosensitive layer and to inhibit charge injection from the conductive substrate side to the photosensitive layer side.

(Metal Oxide Particles)

Examples of the metal oxide particles include alumina particles, zinc oxide particles, titanium oxide particles, and particles of conductive metal oxides (e.g., phosphorous-doped tin oxide and antimony-doped tin oxide). The metal oxide particles are preferably titanium oxide particles.

The surface treatment layers of the specific inorganic particles are very thin. Therefore, the number average primary particle diameter of the metal oxide particles is substantially equal to the number average primary particle diameter of the specific inorganic particles.

The metal oxide particles have a percentage content of preferably at least 80% by mass and no greater than 99% by mass in the specific inorganic particles, and more preferably at least 85% by mass and no greater than 93% by mass.

(Surface Treatment Layers)

The surface treatment layers contain a component derived from an organic siloxane compound and at least one of aluminum oxide and silica. Note that the aluminum oxide and the silica contained in the surface treatment layers are particulate or form homogeneous films, for example. The component derived from an organic siloxane compound may be the organic siloxane compound itself or a compound produced through chemical reaction of the organic siloxane compound with the metal oxide particles, oxygen, or the like. The surface treatment layers may have a single-layer structure or multilayer structure.

The organic siloxane compound is a compound with a siloxane bond (Si—O—Si bond) and an organic group (e.g., an alkyl group with a carbon number of at least 1 and no greater than 5 optionally substituted with a substituent, a cycloalkyl group with a carbon number of at least 4 and no greater than 8 optionally substituted with a substituent, or an aryl group with a carbon number of at least 6 and no greater than 10 optionally substituted with a substituent). The organic group is preferably a methyl group, an ethyl group, or a phenyl group. The organic siloxane compound may be commercially available under the name "silicone oil."

Examples of the organic siloxane compound include polysiloxane compounds substituted with an organic group. Examples of the polysiloxane compounds substituted with an organic group include dimethylpolysiloxane, methylphenylpolysiloxane, and methylhydrogenpolysiloxane. The organic siloxane compound is preferably methylhydrogenpolysiloxane.

The total percentage content of the aluminum oxide, the silica, and the component derived from an organic siloxane compound is preferably at least 90% by mass in the surface treatment layers, more preferably at least 99% by mass, and further preferably 100% by mass. The surface treatment layers preferably contain only aluminum oxide, silica, and a component derived from an organic siloxane compound or contain only silica and a compound derived from an organic siloxane compound, and more preferably contain only aluminum oxide, silica, and an organic siloxane compound or contain only silica and an organic siloxane compound. Yet further preferably, the surface treatment layers contain only aluminum oxide, silica, and methyl hydrogen polysiloxane, contain only aluminum oxide, silica, and methylpolysiloxane, or contain only silica and methyl hydrogen polysiloxane.

The surface treatment layers are layers formed by surface treatment of metal oxide particles with a surface treatment agent, for example. The surface treatment agent may contain an organic siloxane compound, aluminum oxide, and silica, or contain an organic siloxane compound and a compound (e.g., aluminum hydroxide or hydrated silica) that generates aluminum oxide or silica through treatment with an organic siloxane compound, such as baking. An example of the surface treatment is baking followed by application of a surface treatment agent onto the metal oxide particles. Note that the surface treatment layers may be formed on the surfaces of the metal oxide particles at once by surface treatment with a surface treatment agent containing an organic siloxane compound and aluminum oxide or silica in preparation of the specific inorganic particles. However, in preparation of the specific inorganic particles, it is possible that first surface treatment layers are formed on the surface of the metal oxide particles with a first surface treatment agent containing aluminum oxide or silica, following formation of second surface treatment layers on the first surface treatment layers with a second surface treatment agent containing an organic siloxane compound.

The mass of the surface treatment layers is preferably at least 1 part by mass and no greater than 30 parts by mass relative to 100 parts by mass of the metal oxide particles in the specific organic particles, and more preferably at least 5 parts by mass and no greater than 20 parts by mass. As a result of the mass of the surface treatment layers being set to at least 1 part by mass, dispersibility of the specific inorganic particles in the intermediate layers can be further optimized. As a result of the mass of the surface treatment layers being set to no greater than 30 parts by mass, resistance of the specific inorganic particles can be optimized.

[Photosensitive Layer]

The photosensitive layer contains a charge generating material, a hole transport material, and a binder resin for photosensitive layer use, for example. When the photosensitive member of the first embodiment is a single-layer photosensitive member (i.e., when the photosensitive layer is a single layer), the photosensitive layer (single-layer photosensitive layer) contains a binder resin for photosensitive layer use, a charge generating material, an electron transport material, and a hole transport material, for example. The single-layer photosensitive layer may further contain an additive as necessary.

When the photosensitive member of the first embodiment is a multi-layer photosensitive member (i.e., when the photosensitive layer includes a charge generating layer and a charge transport layer), the charge generating layer included in the photosensitive layer contains a charge generating material, for example. The charge generating layer may further contain a base resin for photosensitive layer use as necessary. The charge transport layer contains a hole transport material and a binder resin for photosensitive layer use. Each of the charge generating layer and the charge transport layer may further contain an additive as necessary.

(Charge Generating Material)

Examples of the charge generating material include phthalocyanine-based pigments, perylene-based pigments, bisazo pigments, tris-azo pigments, dithioketopyrrolopyrrole pigments, metal-free naphthalocyanine pigments, metal naphthalocyanine pigments, squaraine pigments, indigo pigments, azulenium pigments, cyanine pigments, powders of inorganic photoconductive materials (e.g., selenium, selenium-tellurium, selenium-arsenic, cadmium sulfide, and amorphous silicon), pyrylium pigments, anthanthrone-based pigments, triphenylmethane-based pigments, threne-based pigments, toluidine-based pigments, pyrazoline-based pigments, and quinacridone-based pigments.

The phthalocyanine-based pigments have a phthalocyanine structure. Examples of the phthalocyanine-based pigments include metal phthalocyanines and metal-free phthalocyanine. Examples of the metal phthalocyanines include titanyl phthalocyanine, hydroxygallium phthalocyanine, and chlorogallium phthalocyanine. Titanyl phthalocyanine is preferable as a metal phthalocyanine. Titanyl phthalocyanine is represented by formula (CG-1). Metal-free phthalocyanine is represented by formula (CG-2).

(CG-1)

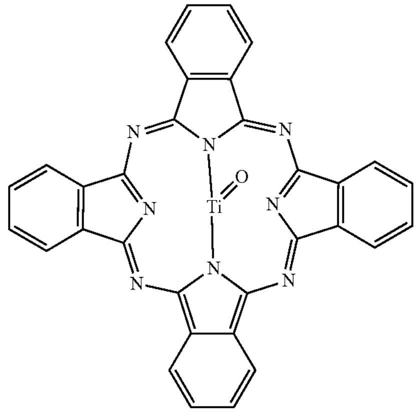

(CG-2)

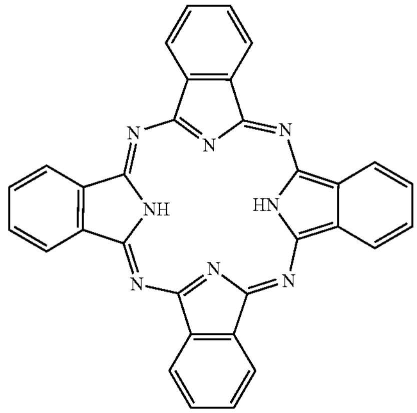

The phthalocyanine-based pigments may be crystalline or non-crystalline. An example of crystals of metal-free phthalocyanine is X-form crystal of metal-free phthalocyanine (also referred to below as X-form metal-free phthalocyanine). Examples of crystals of titanyl phthalocyanine include α-form, β-form, or Y-form crystal of titanyl phthalocyanine (also referred to below as α-form titanyl phthalocyanine, β-form titanyl phthalocyanine, and Y-form titanyl phthalocyanine, respectively).

For example, it is preferable for digital optical image forming apparatuses (e.g., laser beam printers or facsimile machines using a light source such as semiconductor laser) to include a photosensitive member with sensitivity in a wavelength range of at least 700 nm. In terms of having a high quantum yield in a wavelength range of at least 700 nm, the charge generating material is preferably a phthalocyanine-based pigment, more preferably titanyl phthalocyanine or metal-free phthalocyanine, and particularly preferably Y-form titanyl phthalocyanine or X-form metal-free phthalocyanine.

Y-form titanyl phthalocyanine exhibits a main peak for example at a Bragg angle (2θ+) 0.2° of 27.2° in a CuKα characteristic X-ray diffraction spectrum. The main peak in the CuKα characteristic X-ray diffraction spectrum refers to a peak having the first or second highest intensity in the range where the Bragg angle (2θ±0.2°) is at least 3° and no greater than 40°. Y-form titanyl phthalocyanine exhibits no peak at a Bragg angle of 26.2° in the CuKα characteristic X-ray diffraction spectrum.

The CuKα characteristic X-ray diffraction spectrum can be plotted by the following method, for example. First, a sample (titanyl phthalocyanine) is loaded in a sample holder of an X-ray diffraction device (e.g., "RINT (registered Japanese trademark) 1100", product of Rigaku Corporation) and an X-ray diffraction spectrum is plotted under conditions of use of a Cu X-ray tube, a tube voltage of 40 kV, a tube current of 30 mA, and a wavelength of the CuKα characteristic X-ray of 1.542 Å. The measurement range (2θ) is for example from 3° to 40° (stating angle of 3° and stop angle of 40°), and the scanning speed is for example 10°/min. The main peak is identified in the plotted X-ray diffraction spectrum and the Bragg angle of the main peak is read.

When the photosensitive member of the first embodiment is a single-layer photosensitive member, the charge generating material has a content of preferably at least 0.1 parts by mass and no greater than 10.0 parts by mass relative to 100 parts by mass of the binder resin for photosensitive layer use in the photosensitive layer, and more preferably at least 2.0 parts by mass and no greater than 5.0 parts by mass. When the photosensitive member of the first embodiment is a multi-layer photosensitive member, the charge generating material has a content of preferably at least 30.0 parts by mass and no greater than 300.0 parts by mass relative to 100 parts by mass of the base resin for photosensitive layer use in the charge generating layer, and more preferably at least 120.0 parts by mass and no greater than 180.0 parts by mass.

(Hole Transport Material)

Examples of the hole transport material include triphenylamine derivatives, diamine derivatives (e.g., an N,N,N',N'-tetraphenylbenzidine derivative, an N,N,N',N'-tetraphenylphenylenediamine derivative, an N,N,N',N'-tetraphenylnaphtylenediamine derivative, an N,N,N',N'-tetraphenylphenanthrylenediamine derivative, and a di(aminophenylethenyl)benzene derivative), oxadiazole-based compounds (e.g., 2,5-di(4-methylaminophenyl)-1,3,4-oxadiazole), styryl-based compounds (e.g., 9-(4-diethylaminostyryl) anthracene), carbazole-based compounds (e.g., polyvinyl carbazole), organic polysilane compounds, pyrazoline-based compounds (e.g., 1-phenyl-3-(p-dimethylaminophenyl) pyrazoline), hydrazone-based compounds, indole-based compounds, oxazole-based compounds, isoxazole-based compounds, thiazole-based compounds, thiadiazole-based compounds, imidazole-based compounds, pyrazole-based compounds, and triazole-based compounds.

Examples of the hole transport material include compounds represented by formulas (10), (20), (23), (24), and (25) (also referred to below as hole transport materials (10), (20), (23), (24), and (25), respectively).

(10)

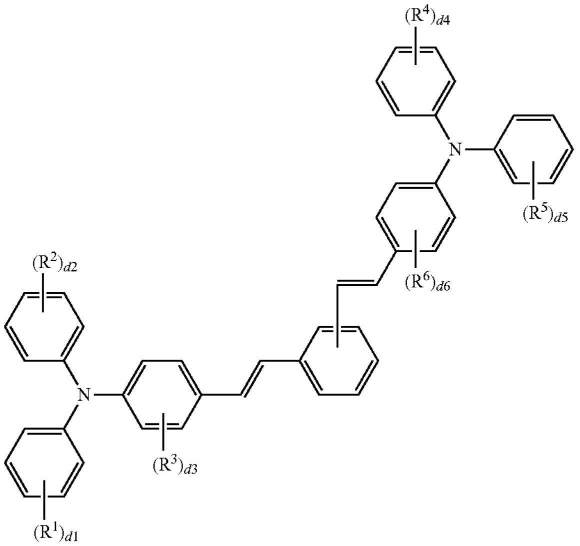

(20)

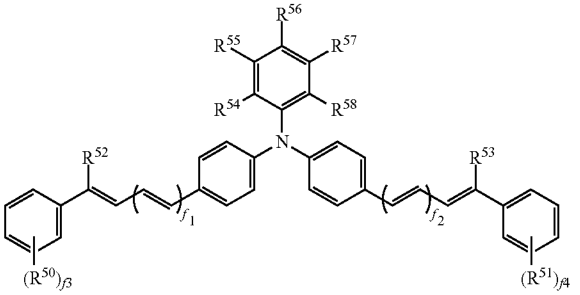

In formula (10), $R^1$ to $R^6$ each represent, independently of one another, a phenyl group, an alkyl group with a carbon number of at least 1 and no greater than 8, or an alkoxy group with a carbon number of at least 1 and no greater than 8. d1, d2, d4, and d5 each represent, independently of one another, an integer of at least 0 and no greater than 5. d3 and d6 each represent, independently of one another, an integer of at least 0 and no greater than 4. Preferably, $R^1$ to $R^6$ each represent, independently of one another, an alkyl group with a carbon number of at least 1 and no greater than 3. Preferably, d1, d2, d4, and d5 each represent, independently of one another, 0, 1, or 2. Preferably, d3 and d6 each represent 0.

When d1 to d6 in formula (10) each represent an integer of at least 2, the respective corresponding chemical groups $R^1$ to $R^6$ may represent the same group as or different groups from each other.

In formula (20), $R^{50}$ and $R^{51}$ each represent, independently of one another, a phenyl group, an alkyl group with a carbon number of at least 1 and no greater than 6, or an alkoxy group with a carbon number of at least 1 and no greater than 6. $R^{52}$, $R^{53}$, $R^{54}$, $R^{55}$, $R^{56}$, $R^{57}$, and $R^{58}$ each represent, independently of one another, a hydrogen atom, an alkyl group with a carbon number of at least 1 and no greater than 6, an alkoxy group with a carbon number of at least 1 and no greater than 6, or a phenyl group optionally substituted with an alkyl group with a carbon number of at least 1 and no greater than 6. $f_1$ and $f_2$ each represent, independently of one another, an integer of at least 0 and no greater than 2. $f_3$ and $f_4$ each represent, independently of one another, an integer of at least 0 and no greater than 5.

In formula (20), when $f_3$ represents an integer of at least 2 and no greater than 5, the chemical groups $R^{50}$ may represent the same group as or different groups from each other. When $f_4$ represents an integer of at least 2 and no greater than 5, the chemical groups $R^{51}$ may represent the same group as or different groups from each other.

In formula (20), preferably, $R^{50}$ and $R^{51}$ each represent, independently of one another, an alkyl group with a carbon number of at least 1 and no greater than 3. Preferably, $R^{52}$ and $R^{53}$ each represent a phenyl group optionally substituted with a hydrogen atom or a methyl group. Preferably, $R^{54}$ to $R^{58}$ each represent, independently of one another, a hydrogen atom, an alkyl group with a carbon number of at least 1 and no greater than 4, or an alkoxy group with a carbon number of at least 1 and no greater than 3. Preferably, $f_1$ and $f_2$ each represent 0 or each represent 1. Preferably, $f_3$ and $f_4$ each represent, independently of one another, 0 or 1.

(23)

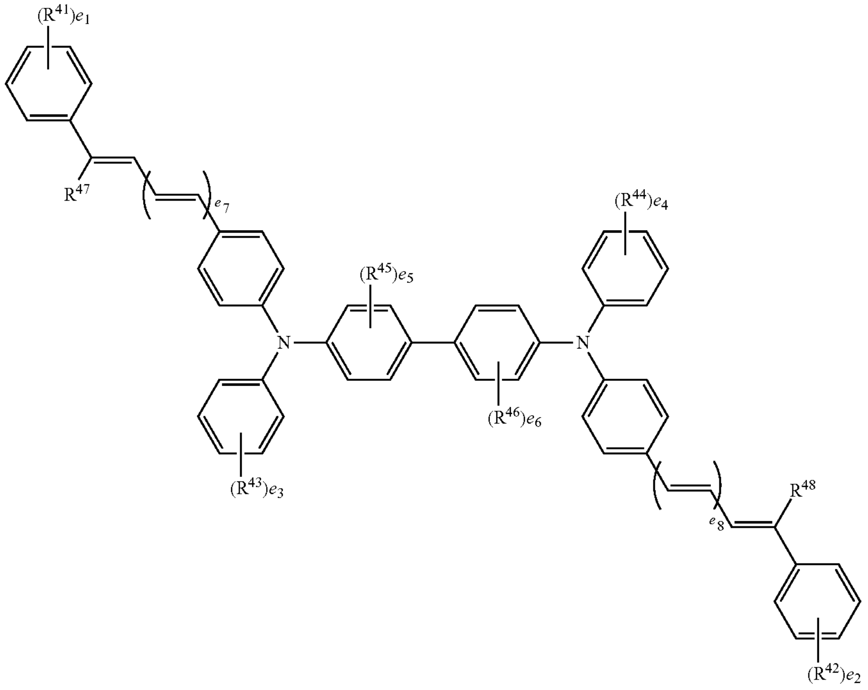

(24)

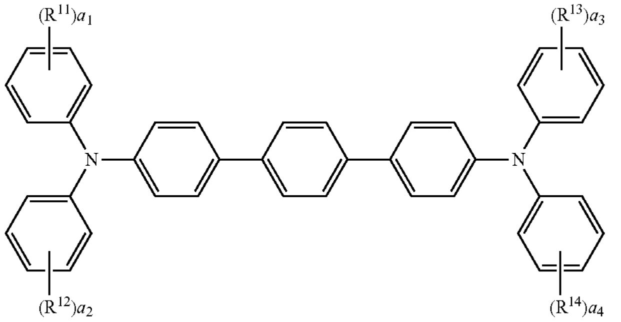

In formula (23), $R^{41}$, $R^{42}$, $R^{43}$, $R^{44}$, $R^{45}$, and $R^{46}$ each represent, independently of one another, a phenyl group or an alkyl group with a carbon number of at least 1 and no greater than 6. $R^{47}$ and $R^{48}$ each represent, independently of one another, a hydrogen atom, a phenyl group, or an alkyl group with a carbon number of at least 1 and no greater than 6. $e_1$, $e_2$, $e_3$, and $e_4$ each represent, independently of one another, an integer of at least 0 and no greater than 5. $e_5$ and $e_6$ each represent, independently of one another, an integer of at least 0 and no greater than 4. $e_7$ and $e_8$ each represent, independently of one another, 0 or 1.

When $e_1$ to $e_6$ in formula (23) each represent an integer of at least 2 and no greater than 4, the respective corresponding chemical groups $R^{41}$ to $R^{46}$ may represent the same group as or different groups from each other.

In formula (23), preferably, $R^{41}$ to $R^{46}$ each represent, independently of one another, an alkyl group with a carbon number of at least 1 and no greater than 3. Preferably, $R^{47}$ and $R^{48}$ each represent a hydrogen atom. Preferably, $e_1$, $e_2$, $e_5$, and $e_6$ each represent 0. Preferably, $e_3$ and $e_4$ each represent 2. Preferably, $e_7$ and $e_8$ each represent 0 or each represent 1.

In formula (24), $R^{11}$, $R^{12}$, $R^{13}$, and $R^{14}$ each represent, independently of one another, an alkyl group with a carbon number of at least 1 and no greater than 6 or an alkoxy group with a carbon number of at least 1 and no greater than 6. $a_1$, $a_2$, $a_3$, and $a_4$ each represent, independently of one another, an integer of at least 0 and no greater than 5.

When $a_1$ to $a_4$ in formula (24) each represent an integer of at least 2 and no greater than 5, the respective corresponding chemical groups $R^{11}$ to $R^{14}$ may represent the same group as or different groups from each other.

In formula (24), preferably, $R^{11}$, $R^{12}$, $R^{13}$, and $R^{14}$ each represent, independently of one another, an alkyl group with a carbon number of at least 1 and no greater than 3. Preferably, $a_1$, $a_2$, $a_3$, and $a_4$ each represent, independently of one another, 0 or 1.

(25)

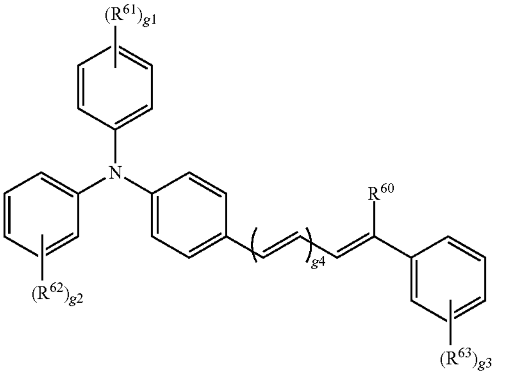

In formula (25), $R^{60}$ represents a hydrogen atom, an alkyl group with a carbon number of at least 1 and no greater than 8, an alkoxy group with a carbon number of at least 1 and no greater than 8, or a phenyl group optionally substituted with an alkyl group with a carbon number of at least 1 and no greater than 8. $R^{61}$, $R^{62}$, and $R^{63}$ each represent, independently of one another, an alkyl group with a carbon number of at least 1 and no greater than 8 or an alkoxy group with a carbon number of at least 1 and no greater than 8. g1, g2, and g3 each represent, independently of one another, an integer of at least 0 and no greater than 5. g4 represents 0 or 1. Preferably, $R^{60}$ represents a phenyl group. Preferably, $R^{61}$, $R^{62}$ and $R^{63}$ each represent, independently of one another, an alkyl group with a carbon number of at least 1 and no greater than 3. Preferably, g1 and g2 each represent 1. Preferably, g3 represents 0.

When g1 to g3 in formula (25) each represent an integer of at least 2 and no greater than 5, the respective corresponding chemical groups $R^{61}$ to $R^{63}$ may represent the same group as or different groups from each other.

The hole transport material is preferably a compound represented by any of formulas (HTM-1) to (HTM-11) (also referred to below as hole transport materials (HTM-1) to (HTM-11), respectively).

(HTM-1)

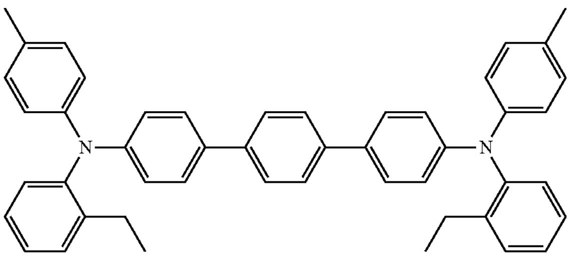

(HTM-2)

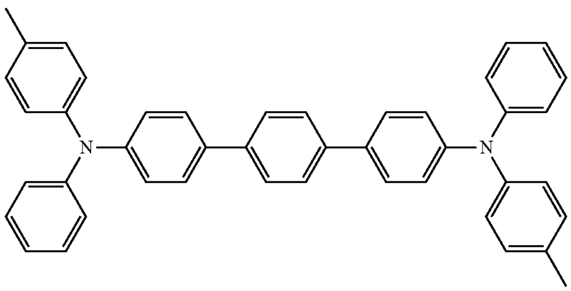

(HTM-3)

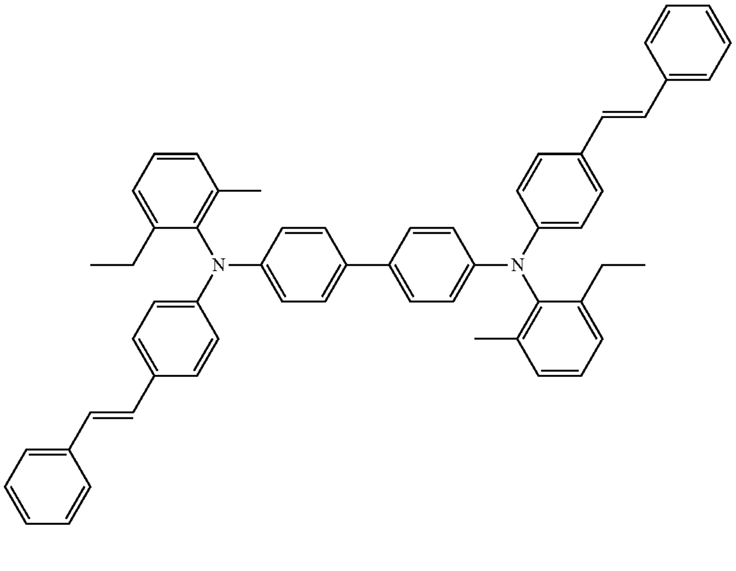

-continued
(HTM-4)
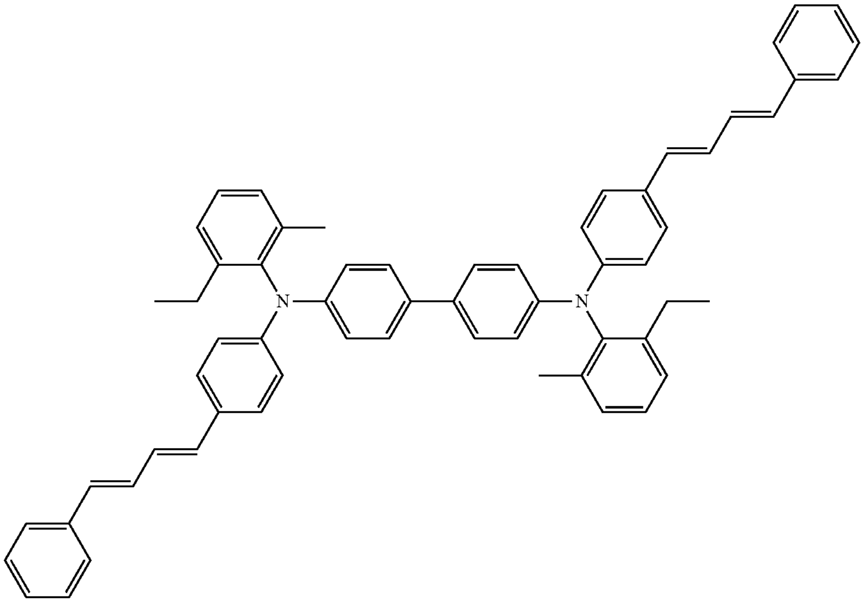
(HTM-5)
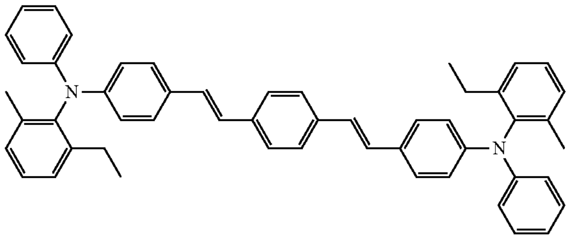
(HTM-6)
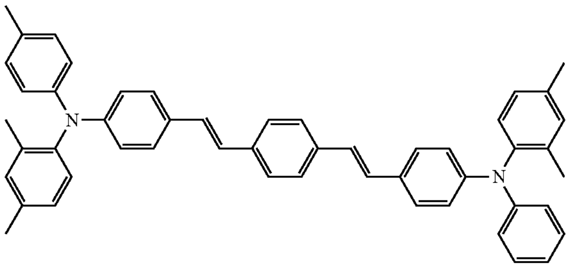
(HTM-7)
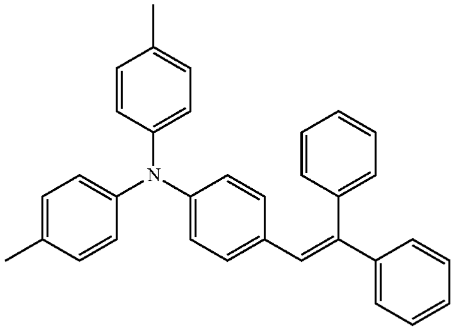
(HTM-8)
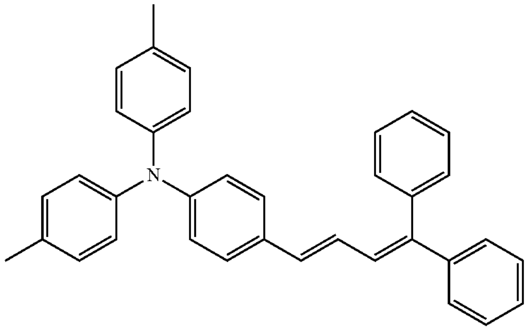
(HTM-9)
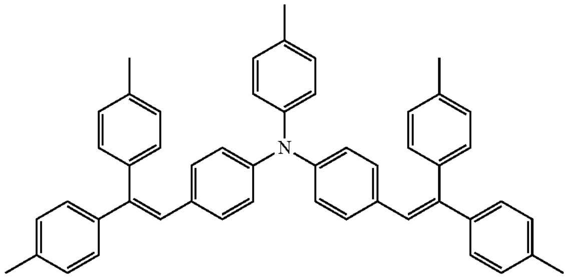
(HTM-10)
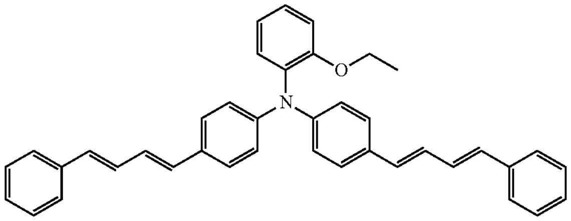

-continued (HTM-11)

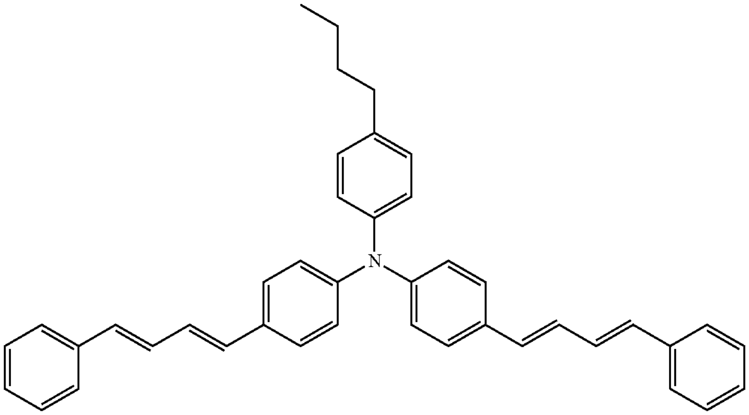

When the photosensitive member of the first embodiment is a single-layer photosensitive member, the content of the hole transport material is preferably at least 10 parts by mass and no greater than 200 parts by mass relative to 100 parts by mass of the binder resin for photosensitive layer use in the single-layer photosensitive member, and more preferably at least 50 parts by mass and no greater than 100 parts by mass. When the photosensitive member of the first embodiment is a multi-layer photosensitive member, the content of the hole transport material is preferably at least 10 parts by mass and no greater than 150 parts by mass relative to 100 parts by mass of the binder resin for photosensitive layer use in the charge transport layer, and more preferably at least 30 parts by mass and no greater than 60 parts by mass.

(Electron Transport Material)

Examples of the electron transport material include quinone-based compounds, diimide-based compounds, hydrazone-based compounds, malononitrile-based compounds, thiopyran-based compounds, trinitrothioxanthone-based compounds, 3,4,5,7-tetranitro-9-fluorenone-based compounds, dinitroanthracene-based compounds, dinitroacridine-based compounds, tetracyanoethylene, 2,4,8-trinitrothioxanthone, dinitrobenzene, dinitroacridine, succinic anhydride, maleic anhydride, and dibromomaleic anhydride. Examples of the quinone-based compounds include diphenoquinone-based compounds, azoquinone-based compounds, anthraquinone-based compounds, naphthoquinone-based compounds, nitroanthraquinone-based compounds, and dinitroanthraquinone-based compounds.

The electron transport material preferably contains at least one of compounds represented by formulas (11) to (17). In the following, the compounds represented by formulas (11) to (17) may be also referred to below as electron transport materials (11) to (17), respectively.

(11)

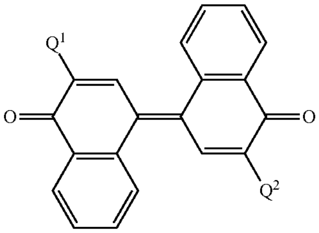

-continued (12)

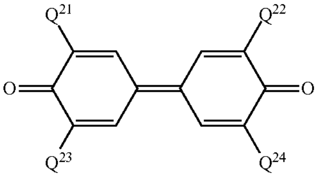

(13)

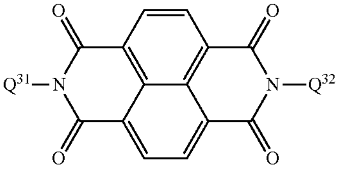

(14)

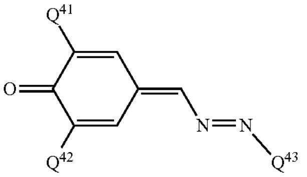

(15)

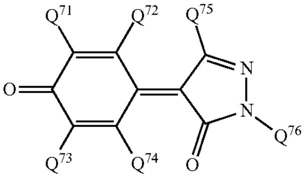

(16)

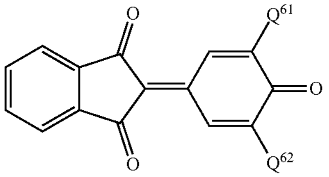

-continued (17)

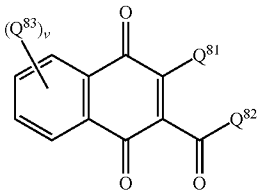

$Q^1$ and $Q^2$ in formula (11), $Q^{21}$, $Q^2$, $Q^{73}$, and $Q^{24}$ in formula (12), $Q^{31}$ and $Q^{32}$ in formula (13), $Q^{41}$, $Q^{42}$, and $Q^{43}$ in formula (14), $Q^1$, $Q^{72}$, $Q^{73}$, $Q^{74}$, $Q^{75}$, and $Q^{76}$ in formula (15), and $Q^{61}$ and $Q^{62}$ in formula (16) each represent, independently of one another, a hydrogen atom, a halogen atom, a cyano group, an alkyl group with a carbon number of at least 1 and no greater than 6, an alkenyl group with a carbon number of at least 2 and no greater than 6, an alkoxy group with a carbon number of at least 1 and no greater than 6, or an aryl group with a carbon number of at least 6 and no greater than 14 optionally substituted with at least one specific substituent. The specific substituent is at least one substituent selected from the group consisting of a halogen atom and an alkyl group with a carbon number of at least 1 and no greater than 6.

Preferably, $Q^1$ and $Q^2$ in formula (11) each represent, independently of one another, an alkyl group with a carbon number of at least 4 and no greater than 6. Preferably, $Q^{21}$, $Q^{22}$, $Q^{23}$, and $Q^{24}$ in formula (12) each represent, independently of one another, an alkyl group with a carbon number of at least 1 and no greater than 5. Preferably, $Q^{31}$ and $Q^{32}$ in formula (13) each represent, independently of one another, a phenyl group optionally substituted with an alkyl group with a carbon number of at least 1 and no greater than 3. Preferably, $Q^{41}$ and $Q^{42}$ in formula (14) each represent, independently of one another, an alkyl group with a carbon number of at least 3 and no greater than 5. Preferably, $Q^{43}$ in formula (14) represents a phenyl group optionally substituted with a halogen atom. Preferably, $Q^{71}$ and $Q^{73}$ in formula (15) each represent, independently of one another, an alkyl group with a carbon number of at least 3 and no greater than 5. Preferably, $Q^{72}$ and $Q^{74}$ in formula (15) each represent a hydrogen atom. Preferably, $Q^{75}$ in formula (15) represents a phenyl group or an alkyl group with a carbon number of at least 2 and no greater than 4. Preferably, $Q^{76}$ in formula (15) represents a phenyl group optionally substituted with a halogen atom, or an alkyl group with a carbon number of at least 3 and no greater than 5. Preferably, $Q^{61}$ and $Q^{62}$ in formula (16) each represent, independently of one another, an alkyl group with a carbon number of at least 3 and no greater than 5.

In formula (17), $Q^{81}$ represents an alkyl group with a carbon number of at least 1 and no greater than 6 or an aryl group with a carbon number of at least 6 and no greater than 14. $Q^{82}$ represents an alkyl group with a carbon number of at least 1 and no greater than 6, an aryl group with a carbon number of at least 6 and no greater than 14, an alkoxy group with a carbon number of at least 1 and no greater than 6, an aralkyl group with a carbon number of at least 7 and no greater than 20, an aryloxy group with a carbon number of at least 6 and no greater than 14, or an aralkyloxy group with a carbon number of at least 7 and no greater than 20. $Q^{83}$ represents an alkyl group with a carbon number of at least 1 and no greater than 6. v represents an integer of at least 0 and no greater than 4. Preferably, $Q^{81}$ represents a phenyl group. Preferably, $Q^{82}$ represents an aralkyloxy group with a carbon number of at least 7 and no greater than 8. Preferably, $Q^{83}$ represents an alkyl group with a carbon number of at least 1 and no greater than 3. Preferably, v represents 0.

The electron transport material is preferably any of compounds represented by formulas (ETM-1) to (ETM-8) (also referred to below as electron transport materials (ETM-1) to (ETM-8), respectively).

(ETM-1)

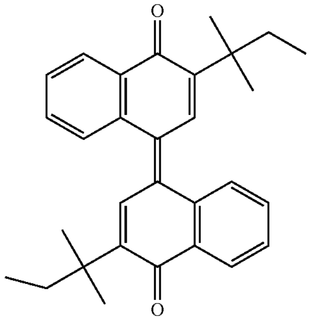

(ETM-2)

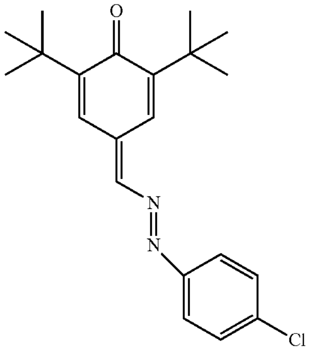

(ETM-3)

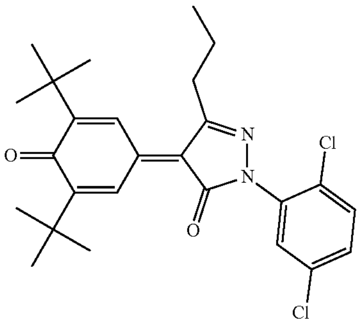

(ETM-4)

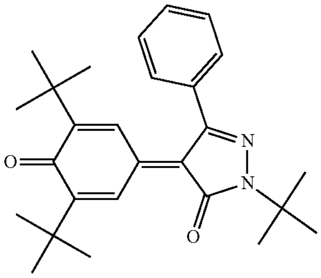

-continued (ETM-5)

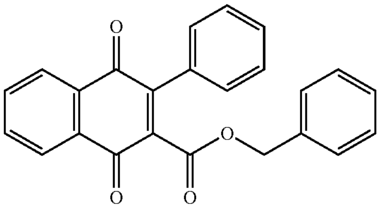

(ETM-6)

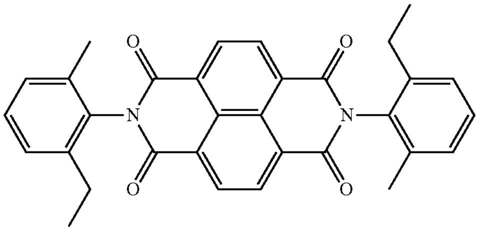

(ETM-7)

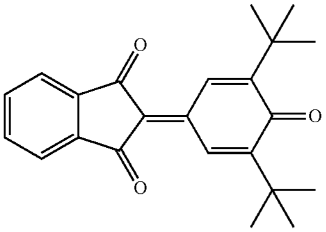

(ETM-8)

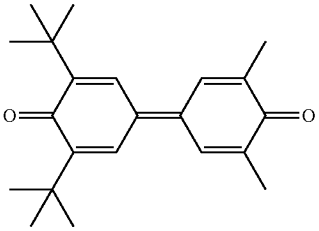

Any of the electron transport materials (11) to (17) has a percentage content of preferably at least 80% by mass in the electron transport material, more preferably at least 90% by mass, and further preferably 100% by mass.

When the photosensitive member of the first embodiment is a single-layer photosensitive member, the electron transport material has a content of preferably at least 5 parts by mass and no greater than 150 parts by mass relative to 100 parts by mass of the binder resin for photosensitive layer use in the single-layer photosensitive layer, and more preferably at least 20 parts by mass and no greater than 60 parts by mass.

(Binder Resin for Photosensitive Layer Use)

Examples of the binder resin for photosensitive layer use include thermoplastic resins (specific examples include polyarylate resin, polycarbonate resin, styrene-based resin, styrene-butadiene copolymers, styrene-acrylonitrile copolymers, styrene-maleic acid copolymers, styrene-acryl acid copolymers, acrylic copolymers, polyethylene resin, ethylene-vinyl acetate copolymers, chlorinated polyethylene resin, polyvinyl chloride resin, polypropylene resin, ionomers, vinyl chloride-vinyl acetate copolymers, polyester resin, alkyd resin, polyamide resin, polyurethane resin, polysulfone resin, diallyl phthalate resin, ketone resin, polyvinyl butyral resin, polyvinyl acetal resin, and polyether resin), thermosetting resins (specific examples include silicone resin, epoxy resin, phenolic resin, urea resin, melamine resin, and crosslinkable thermosetting resin other than these), and photocurable resins (specific examples include epoxy-acrylic acid-based resin and urethane-acrylic acid-based copolymers).

Among these resins, polycarbonate resin is preferable in terms of obtaining a single-layer photosensitive layer or a charge transport layer with an excellent balance between processability, mechanical strength, optical properties, and abrasion resistance. Examples of the polycarbonate resin include bisphenol Z polycarbonate resin, bisphenol B polycarbonate resin, bisphenol ZC polycarbonate resin, bisphenol C polycarbonate resin, and bisphenol A polycarbonate resin. The binder resin for photosensitive layer use is preferably bisphenol Z polycarbonate resin. Bisphenol Z polycarbonate resin is a resin including a repeating unit represented by formula (BisZ).

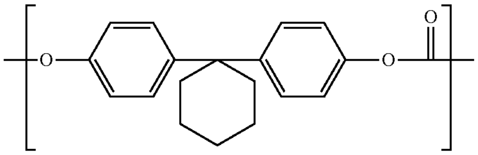

(BisZ)

When the photosensitive member of the first embodiment is a single-layer photosensitive member, the percentage content of the binder resin for photosensitive layer use is preferably at least 20% by mass and no greater than 60% by mass in the single-layer photosensitive layer. When the photosensitive member of the first embodiment is a multi-layer photosensitive member, the percentage content of the binder resin for photosensitive layer use is preferably at least 40% by mass and no greater than 75% by mass in the multi-layer photosensitive member.

(Base Resin for Photosensitive Layer Use)

Examples of the base resin for photosensitive layer use contained in the charge generating layer include the same resins as those listed as the binder resin for photosensitive layer use contained in the charge transport layer. However, the base resin for photosensitive layer use preferably differs from the binder resin for photosensitive layer use for convenience in forming the charge generating layer and the charge transport layer. The base resin for photosensitive layer use is preferably polyvinyl acetal resin.

Preferably, the percentage content of the base resin for photosensitive layer use is at least 20% by mass and no greater than 50% by mass in the charge generating layer.

(Additive)

Examples of the additive contained in the photosensitive layer include ultraviolet absorbing agents, antioxidants, radical scavengers, singlet quenchers, softeners, surface modifiers, extenders, thickeners, dispersion stabilizers, waxes, donors, surfactants, plasticizers, sensitizers, electron acceptor compounds, and leveling agents. Examples of the leveling agents include silicone oils and a more specific example is dimethyl silicone oil.

When the photosensitive member of the first embodiment is a single-layer photosensitive member, the single-layer photosensitive layer preferably contains a silicone oil. In this case, the content of the silicone oil is preferably at least 0.01 parts by mass and no greater than 0.5 parts by mass relative to 100 parts by mass of the binder resin for photosensitive layer use in the single-layer photosensitive layer. When the photosensitive member of the first embodiment is a multi-layer photosensitive member, the charge transport layer preferably contains a silicone oil. In this case, the content of the silicone oil is preferably at least 0.01 parts by mass and no greater than 0.5 parts by mass relative to 100 parts by mass of the binder resin for photosensitive layer use in the charge transport layer.

[Conductive Substrate]

The conductive substrate is not limited particularly as long as at least the surface portion thereof is constituted by a conductive material. An example of the conductive substrate is a conductive substrate constituted by a conductive material. Another example of the conductive substrate is a conductive substrate covered with a conductive material. Examples of the conductive material include aluminum, iron, copper, tin, platinum, silver, vanadium, molybdenum, chromium, cadmium, titanium, nickel, palladium, and indium. It is possible to combine two or more conductive materials for use as an alloy (specific examples include aluminum alloys, stainless steel, and brass). In terms of favorable charge mobility from the photosensitive layer to the conductive substrate, aluminum or an aluminum alloy is preferable as the conductive material. The shape of the conductive substrate is selected as appropriate according to the configuration of an image forming apparatus that includes the conductive substrate. The conductive substrate may be sheet-shaped or drum-shaped, for example. The thickness of the conductive substrate is selected as appropriate according to the shape of the conductive substrate.

[Photosensitive Member Production Method]

Next, an example of a production method of the photosensitive member of the first embodiment is described. The production method of the photosensitive member of the first embodiment includes an intermediate layer formation process and a photosensitive layer formation process, for example.

(Intermediate Layer Formation Process)

In the intermediate layer formation process, an application liquid (also referred to below as an application liquid for intermediate layer formation) for forming the intermediate layer is prepared. The application liquid for intermediate layer formation contains the specific inorganic particles, the specific polyamide resin, and a solvent. Next, the application liquid for intermediate layer formation is applied onto the conductive substrate. Next, at least a portion of the solvent contained in the applied application liquid for intermediate layer formation is removed to form the intermediate layer.

(Photosensitive Layer Formation Process in Single-Layer Photosensitive Member Production)

The photosensitive layer formation process when the photosensitive member of the first embodiment is a single-layer photosensitive member is described below. The photosensitive layer formation process in single-layer photosensitive member production includes a single-layer photosensitive layer formation process. In the single-layer photosensitive layer formation process, an application liquid (also referred to below as an application liquid for single-layer photosensitive layer formation) for forming the single-layer photosensitive layer is prepared. The application liquid for single-layer photosensitive layer formation contains the charge generating material, the hole transport material, the binder resin for photosensitive layer use, a solvent, and any optional components (e.g., the electron transport material and the additive), for example. The application liquid for single-layer photosensitive layer formation is prepared by mixing the above components. Next, the application liquid for single-layer photosensitive layer formation is applied onto the intermediate layer. Next, at least a portion of the solvent contained in the applied application liquid for single-layer photosensitive layer formation is removed to form the single-layer photosensitive layer.

(Photosensitive Layer Formation Process in Multi-Layer Photosensitive Member Production)

The photosensitive layer formation process when the photosensitive member is a multi-layer photosensitive member is described next. The photosensitive layer formation process in multi-layer photosensitive member production includes a charge generating layer formation process and a charge transport layer formation process.

In the charge generating layer formation process, an application liquid (also referred to below as an application liquid for charge generating layer formation) for forming the charge generating layer is prepared. The application liquid for charge generating layer formation contains the charge generating material, the base resin for photosensitive layer use, a solvent, and any optional components (e.g., the additive), for example. The application liquid for charge generating layer formation is prepared by mixing the above components. Next, the application liquid for charge generating layer formation is applied onto the intermediate layer. Next, at least a portion of the solvent contained in the applied application liquid for charge generating layer formation is removed to form the charge generating layer.

In the charge transport layer formation process, an application liquid (also referred to below as an application liquid for charge transport layer formation) for forming the charge transport layer is prepared. The application liquid for charge transport layer formation contains the hole transport material, the binder resin for photosensitive layer use, a solvent, and any optional components (e.g., the additive). The application liquid for charge transport layer formation is prepared by mixing the above components. Next, the application liquid for charge transport layer formation is applied onto the charge generating layer. Next, at least a portion of the solvent contained in the applied application liquid for charge transport layer formation is removed to form the charge transport layer.

No particular limitations are placed on the solvent contained in the application liquid for intermediate layer formation, the application liquid for single-layer photosensitive layer formation, the application liquid for charge generating layer formation, or the application liquid for charge transport layer formation (also referred to below collectively as application liquids) as long as each component contained in the respective application liquids can be dissolved or dispersed therein. Examples of the solvents include alcohols (specific examples include methanol, ethanol, isopropanol, and butanol), aliphatic hydrocarbons (specific examples include n-hexane, octane, and cyclohexane), aromatic hydrocarbons (specific examples include benzene, toluene, and xylene), halogenated hydrocarbons (specific examples include methylene chloride, chloroform, ethylene chloride, dichloromethane, dichloroethane, carbon tetrachloride, and chlorobenzene), ethers (specific examples include dioxane, dimethyl ether, diethyl ether, tetrahydrofuran, ethylene glycol dimethyl ether, propylene glycol monomethyl ether, and diethylene glycol dimethyl ether), ketones (specific examples include acetone, methyl ethyl ketone, 2-butanone, and cyclohexanone), esters (specific examples include ethyl acetate and methyl acetate), dimethyl formaldehyde, dimethyl formamide, and dimethyl sulfoxide.

The application liquids are prepared by mixing the corresponding components for dissolving or dispersing them in the corresponding solvents. Mixing may be performed using for example a bead mill, a ball mill, a roll mill, a paint shaker, or an ultrasonic disperser.

No particular limitations are placed on the method for applying the application liquids as long as the application liquids can be applied evenly. Examples of the application method include dip coating, spraying, bead application, application using a blade, and application using a roller.

At least a portion of the solvent contained in the application liquid for intermediate layer formation, the application liquid for single-layer photosensitive layer formation, the application liquid for charge generating layer formation, or the application liquid for charge transport layer formation can be removed by heating, pressure reduction, or a combination of heating and pressure reduction, for example. A more specific example of removal is heat treatment (hot air drying) using a high-temperature dryer or a reduced pressure dryer. The temperature of the heat treatment is at least 40° C. and no greater than 150° C., for example. The time for the heat treatment is at least 3 minutes and no greater than 150 minutes, for example.

Second Embodiment: Image Forming Apparatus

Figure 3:
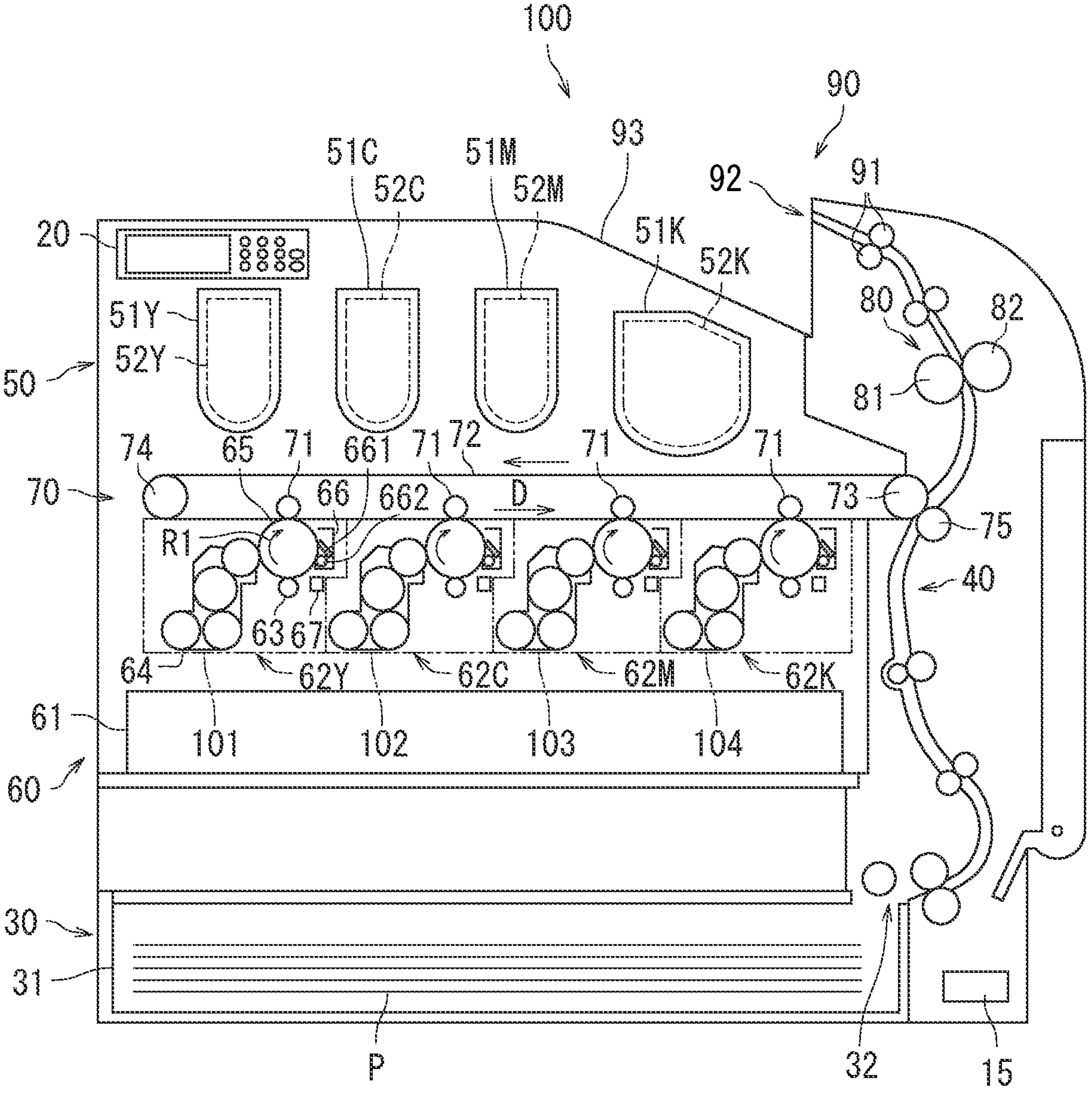
FIG. 3 is a diagram illustrating an example of an image forming apparatus according to a second embodiment of the present disclosure.

With reference to FIG. 3, an image forming apparatus 100, which is an example of an image forming apparatus according to a second embodiment of the present disclosure, is described next. FIG. 3 is a diagram illustrating an example of the configuration of the image forming apparatus 100. The image forming apparatus 100 is a tandem color printer, for example.

As illustrated in FIG. 3, the image forming apparatus 100 includes a controller 15, an operation section 20, a sheet feed section 30, a conveyance section 40, a toner replenishing section 50, an image forming section 60, a transfer device 70, a fixing device 80, and an ejection section 90.

The controller 15 controls operation of each element included in the image forming apparatus 100. The controller 15 includes a processor (not illustrated) and storage (not illustrated). The processor includes a central processing unit (CPU), for example. The storage includes memory such as semiconductor memory and may include a hard disk drive (HDD). The processor executes control programs to control the operation of the image forming apparatus 100. The storage stores the control programs therein.

The operation section 20 receives instructions from a user. Upon receiving an instruction from the user, the operation section 20 transmits a signal indicating the instruction from the user to the controller 15. As a result, image formation operation by the image forming apparatus 100 starts.

The sheet feed section 30 includes a sheet feed cassette 31 and a sheet feed roller group 32. The sheet feed cassette 31 is capable of accommodating multiple recording medium sheets P (e.g., sheets of paper). The sheet feed roller group 32 feeds each of the recording medium sheets P accommodated in the sheet feed cassette 31 one at a time to the conveyance section 40.

The conveyance section 40 includes rollers and a guide member. The conveyance section 40 extends from the sheet feed section 30 to the ejection section 90. The conveyance section 40 conveys the recording medium sheet P from the sheet feed section 30 to the ejection section 90 via the image forming section 60 and the fixing device 80.

The toner replenishing section 50 replenishes the image forming section 60 with toners. The toner replenishing section 50 includes a first fitting section 51Y, a second fitting section 51C, a third fitting section 51M, and a fourth fitting section 51K.

A first toner container 52Y is fitted to the first fitting section 51Y. Likewise, a second toner container 52C, a third toner container 52M, and a fourth toner container 52K are respectively fitted to the second fitting section 51C, the third fitting section 51M, and the fourth fitting section 51K.

The first toner container 52Y, the second toner container 52C, the third toner container 52M, and the fourth toner container 52K accommodate the respective toners. In the second embodiment, the first toner container 52Y accommodates a yellow toner. The second toner container 52C accommodates a cyan toner. The third toner container 52M accommodates a magenta toner. The fourth toner container 52K accommodates a black toner.

The image forming section 60 includes a light exposure device 61, a first image forming unit 62Y, a second image forming unit 62C, a third image forming unit 62M, and a fourth image forming unit 62K.

The first image forming unit 62Y to the fourth image forming unit 62K each include a charger 63, a development device 64, an image bearing member 65, a cleaner 66, and a static eliminator 67.

Note that the first image forming unit 62Y to the fourth image forming unit 62K have the same configuration except the type of the toners replenished by the toner replenishing section 50. As such, the reference numerals for the elements included in the second image forming unit 62C to the fourth image forming unit 62K are omitted in FIG. 3.

Each of the image bearing members 65 is the photosensitive member (specifically, the single-layer photosensitive member 1 or the multi-layer photosensitive member 10) of the first embodiment. As described above, the photosensitive member of the first embodiment can exhibit sensitivity with reduced environmental dependence and inhibit occurrence of fogging in high-temperature and high-humidity environments. Consequently, the image forming apparatus 100 of the second embodiment can exhibit sensitivity with reduced environmental dependence and inhibit occurrence of fogging in high-temperature and high-humidity environments.

The image bearing member 65 rotates in the direction indicated by an arrow R1 in FIG. 3 (clockwise direction in FIG. 3) in the second embodiment. The charger 63, the development device 64, the cleaner 66, and the static eliminator 67 are arrange along the circumferential surface of the image bearing member 65 in the stated order from upstream in terms of the rotational direction of the image bearing member 65.

The charger 63 charges the surface (circumferential surface) of the image bearing member 65. The charger 63 uniformly charges the image bearing member 65 to a specific polarity by discharging. The charger 63 is a charging roller, for example.

The light exposure device 61 exposes the charged surface of the image bearing member 65 to light. In detail, the light exposure device 61 irradiates the charged surface of the image bearing member 65 with laser light. As a result, an electrostatic latent image is formed on the surface of the image bearing member 65.

The corresponding toner is supplied to the development device 64 from the replenishing section 504. The development device 64 supplies the toner replenished by the toner replenishing section 50 to the surface of the image bearing member 65. As a result, the electrostatic latent image formed on the surface of the image bearing member 65 is developed into a toner image.

In the second embodiment, the development device 64 of the first image forming unit 62Y is connected to the first toner container 52Y. In the above configuration, the yellow toner is supplied to the development device 64 of the first image forming unit 62Y. Accordingly, a yellow toner image is formed on the surface of the image bearing member 65 of the first image forming unit 62Y.

Likewise, the development device 64 of the second image forming unit 62C, the development device 64 of the third image forming unit 62M, and the development device 64 of the fourth image forming unit 62K are respectively connected to the second toner container 52C, the third toner container 52M, and the fourth toner container 52K. In the above configuration, the cyan toner, the magenta toner, and the black toner are respectively supplied to the development device 64 of the second image forming unit 62C, the development device 64 of the third image forming unit 62M, and the development device 64 of the fourth image forming unit 62K. Accordingly, a cyan toner image, a magenta toner image, and a black toner image are respectively formed on the surface of the image bearing member 65 of the second image forming unit 62C, the surface of the image bearing member 65 of the third image forming unit 62M, and the surface of the image bearing member 65 of the fourth image forming unit 62K.

The cleaner 66 includes a cleaning member 661 and a rubbing roller 662. The cleaning member 661 is in press contact with the surface of the image bearing member 65 to collect toner attached to the surface of the image bearing member 65 after transfer by a primary transfer roller 71 described later. The cleaning member 661 is a cleaning blade, for example. The rubbing roller 662 rubs the surface of the image bearing member 65 to polish the surface of the image bearing member 65.

The static eliminator 67 irradiates the surface of the image bearing member 65 with static elimination light to eliminate static on the surface of the image bearing member 65.

The transfer device 70 transfers the toner images from the image bearing members 65 to the recording medium sheet P being a transfer target. In detail, the transfer device 70 transfers the respective toner images formed on the surfaces of the image bearing members 65 of the first image forming unit 62Y to the fourth image forming unit 62K to the recording medium sheet P in a superimposed manner. The transfer device 70 transfers the toner images to the recording medium sheet P by a secondary transfer process (intermediate transfer process) in a superimposed manner in the second embodiment. The transfer device 70 includes four primary transfer rollers 71, an intermediate transfer belt 72, a drive roller 73, a driven roller 74, and a secondary transfer roller 75.

The intermediate transfer belt 72 is an endless belt wound around the four primary transfer rollers 71, the drive roller 73, and the driven roller 74. The intermediate transfer belt 72 circulates following the rotation of the drive roller 73. The intermediate transfer belt 72 circulates counterclockwise in FIG. 3. The driven roller 74 is rotationally driven following circulation of the intermediate transfer belt 72.

The first image forming unit 62Y to the fourth image forming unit 62K are arranged opposite to the lower surface of the intermediate transfer belt 72. In the second embodiment, the first image forming unit 62Y to the fourth image forming unit 62K are arranged in the order from the first image forming unit 62Y to the fourth image forming unit 62K from upstream to downstream in terms of a driving direction D of the lower surface of the intermediate transfer belt 72.

The primary transfer rollers 71 are each located opposite a corresponding one of the image bearing members 65 with the intermediate transfer belt 72 therebetween and pressed toward the corresponding image bearing member 65. In the above configuration, the toner images formed on the surfaces of the image bearing members 65 are successively transferred to the intermediate transfer belt 72 by the respective primary transfer rollers 71. In the second embodiment, the yellow toner image, the cyan toner image, the magenta toner image, and the black toner image are successively transferred to the intermediate transfer belt 72 in the stated order in a superimposed manner. In the following, a toner image in which the yellow toner image, the cyan toner image, the magenta toner image, and the black toner image are superimposed may be also referred to below as "layered toner image."

The secondary transfer roller 75 is located opposite to the drive roller 73 with the intermediate transfer belt 72 therebetween. The secondary transfer roller 75 is pressed toward the drive roller 73. In the above configuration, a transfer nip is formed between the secondary transfer roller 75 and the drive roller 73. When the recording medium sheet P passes through the transfer nip, the layered toner image on the intermediate transfer belt 72 is transferred to the recording medium sheet P by the secondary transfer roller 75. In the second embodiment, the yellow toner image, the cyan toner image, the magenta toner image, and the black toner image are transferred to the recording medium sheet P in the stated order, with the upper layer becoming the lower layer. The recording medium sheet P to which the layered toner image has been transferred is conveyed to the fixing device 80 by the conveyance section 40.

The fixing device 80 includes a heating member 81 and a pressure member 82. The heating member 81 and the pressure member 82 are located opposite to each other to form a fixing nip. The recording medium sheet P conveyed from the image forming section 60 passes through the fixing nip to be pressed and heated at a specific fixing temperature. As a result, the layered toner image is fixed to the recording medium sheet P. The recording medium sheet P is conveyed to the ejection section 90 from the fixing device 80 by the conveyance section 40.

The ejection section 90 includes an ejection roller pair 91 and an exit tray 93. The ejection roller pair 91 conveys the recording medium sheet P to the exit tray 93 through an exit port 92. The exit port 92 is formed in the upper part of the image forming apparatus 100.

Figure 4:
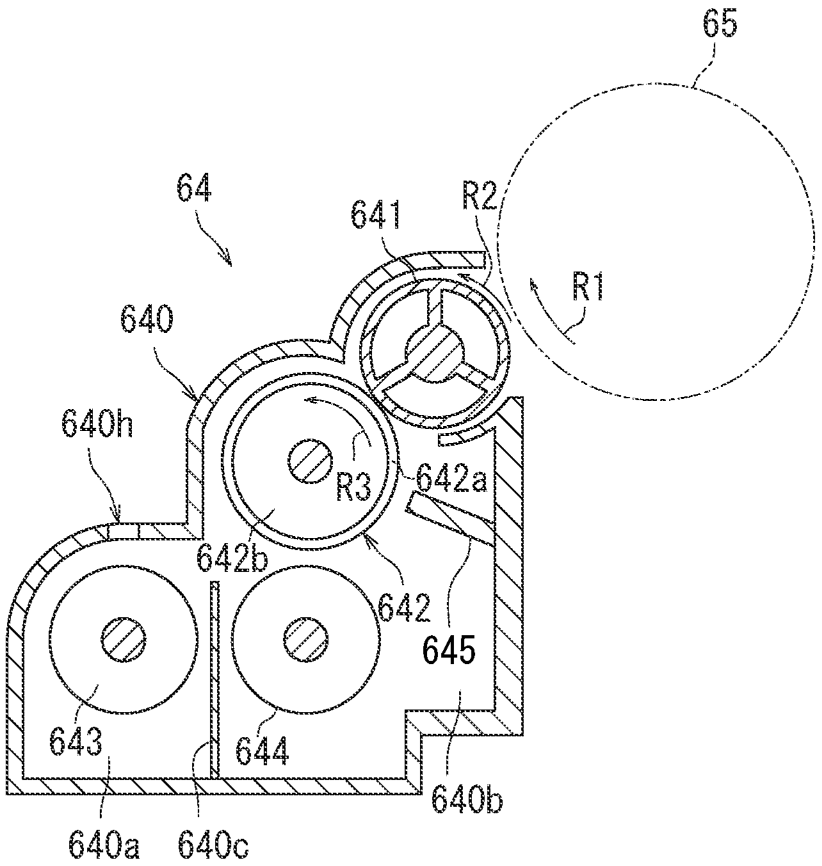
FIG. 4 is a diagram illustrating an example of the configuration of a development device illustrated in FIG. 3.

With reference FIG. 4, the configuration of a development device 64 is described next in detail. FIG. 4 is a diagram illustrating an example of the configuration of the development device 64. In detail, FIG. 4 illustrates the development device 64 of the first image forming unit 62Y. Note that the image bearing member 65 is indicated by a dashed and double dotted line in FIG. 4 for ease of understanding. In the second embodiment, the development device 64 adopts a touchdown development system and a two-component development method using a two-component developer.

As already described with reference to FIG. 3, the developer container 640 of the development device 64 is connected to the first toner container 52Y. In the above configuration, the yellow toner is supplied to the developer container 640 of the development device 64 through a toner replenishment port 640*h*.

As illustrated in FIG. 4, the development device 64 includes inside the developer container 640 thereof a development roller 641, a magnetic roller 642, a first stirring screw 643, a second stirring screw 644, and a blade 645. In detail, the development roller 641 is located opposite to the magnetic roller 642. The magnetic roller 642 is located opposite to the second stirring screw 644. The blade 645 is located opposite to the magnetic roller 642.

The developer container 640 is divided into a first stirring chamber 640*a* and a second stirring chamber 640*b* by a partition wall 640*c*. The partition wall 640*c* extends in the axial direction of the development roller 641. The first stirring chamber 640*a* and the second stirring chamber 640*b* communicate with each other outside both the longitudinally opposite ends of the partition wall 640*c*.

The first stirring screw 643 is located in the first stirring chamber 640*a*. A carrier being magnetic is accommodated in the first stirring chamber 640*a*. A toner being non-magnetic is supplied to the first stirring chamber 640*a* through the toner replenishment port 640*h*. In the example illustrated in FIG. 4, the yellow toner is supplied to the first stirring chamber 640*a*.

The second stirring screw 644 is located in the second stirring chamber 640*b*. The carrier being magnetic is accommodated in the second stirring chamber 640*b*.

The first stirring screw 643 and the second stirring screw 644 stir the yellow toner and the carrier. As a result, a two-component developer containing the carrier and the yellow toner is made up. The two-component developer is thus accommodated in the developer container 640 (more specifically, the first stirring chamber 640*a* and the second stirring chamber 640*b*).

The first stirring screw 643 and the second stirring screw 644 stir while circulating the two-component developer between the first stirring chamber 640*a* and the second stirring chamber 640*b*. As a result, the toner is charged to a specific polarity by friction with the carrier.

When the image bearing members 65 each are the single-layer photosensitive member 1, the toner and the surfaces of the image bearing members 65 are charged to a positive polarity, for example. When the image bearing members 65 each are the multi-layer photosensitive member 10, the toner and the surfaces of the image bearing members 65 are charged to a negative polarity, for example.

The magnetic roller 642 is constituted by a non-magnetic rotating sleeve 642*a* and a magnet 642*b*. The magnet 642*b* is fixed and placed inside the rotating sleeve 642*a*. The magnet 642*b* has a plurality of magnetic poles. The two-component developer is adsorbed to the magnetic roller 642 by the magnetic force of the magnet 642*b*. As a result, a magnetic brush is formed on the surface of the magnetic roller 642.

The blade 645 is located upstream of a location where the magnetic roller 642 is opposite to the development roller 641 in terms of the rotational direction of the magnetic roller 642. The magnetic roller 642 rotates in the direction indicated by an arrow R3 in FIG. 4 (counterclockwise direction in FIG. 4) in the second embodiment. The magnetic roller 642 rotates to transport the magnetic brush to a location opposite to the blade 645. The blade 645 is provided so as to form a gap (space) between the blade 645 and the magnetic roller 642. The blade 645 is constituted by a magnet. In the above configuration, the thickness of the magnetic brush is restricted by the magnetic force of the blade 645.

After the thickness of the magnetic brush on the magnetic roller 642 is restricted, a specific level of voltage is applied to the magnetic roller 642 and the development roller 641. When application of the specific level of voltage makes a specific level of potential difference between the magnetic roller 642 and the development roller 641, the yellow toner contained in the two-component developer is moved to the development roller 641. As a result, a toner thin layer of the yellow toner is formed on the surface of the development roller 641.

The development roller 641 rotates in the direction indicated by an arrow R2 in FIG. 4 (counterclockwise in FIG. 4). In the above configuration, the toner thin layer formed on the surface of the development roller 641 is conveyed to a location opposite to the image bearing member 65, and attached to the image bearing member 65. In the manner described above, the development device 64 supplies the toner charged by friction with the carrier to the surface of the image bearing member 65.

The development device 64 of the first image forming unit 62Y has been described so far with reference to FIG. 4. The configurations of the development devices 64 included in the first image forming unit 62Y to the fourth image forming unit 62K are the same in all aspects other than the type of the toners supplied from the toner replenishing section 50. Description of the configuration of each development device 64 of the second image forming unit 62C to the fourth image forming unit 62K is therefore omitted.

The image forming apparatus 100 being an example of the image forming apparatus of the second embodiment has been described so far with reference to FIGS. 3 and 4. However, the image forming apparatus of the second embodiment is not limited to the image forming apparatus 100. For example, the image forming apparatus may be a monochrome image forming apparatus. In this case, the image forming apparatus need only include a single image forming unit. The image forming apparatus may adopt a rotary system. The charger may be a charging device (e.g., a scorotron charger, a charging brush, or a corotron charger) other than the charging roller. The image forming apparatus may adopt a one-component development method using a one-component developer. The image forming apparatus may adopt a development system (e.g., a development system including a magnetic roller serving also as a development roller without providing a development roller) other than the touchdown development system. The image forming apparatus may adopt a direct transfer process. When the image forming apparatus adopts the direct transfer process, the toner images each are directly transferred to a recording medium sheet from a corresponding one of the image bearing members with the image bearing member in contact with the recording medium sheet. The image forming apparatus may not include the cleaner. The image forming apparatus may not include the static eliminator. The image forming apparatus of the second embodiment has been described so far.

Third Embodiment: Process Cartridge

With further reference to FIG. 3, a first process cartridge 101, a second process cartridge 102, a third process cartridge 103, and a fourth process cartridge 104 each being an example of a third embodiment of the present disclosure is described next. The first process cartridge 101 to the fourth process cartridge 104 of the third embodiment respectively correspond to the first image forming unit 62Y to the fourth image forming unit 62K. The first process cartridge 101 to the fourth process cartridge 104 each include an image bearing member 65 that is the photosensitive member (more specifically, the single-layer photosensitive member 1 or the multi-layer photosensitive member 10) of the first embodiment.

As shown in FIG. 3, each of the first process cartridge 101 to the fourth process cartridge 104 includes a charger 63, a development device 64, an image bearing member 65, a cleaner 66, and a static eliminator 67. However, the process cartridge of the third embodiment is not limited to the first process cartridge 101 to the fourth process cartridge 104. The process cartridge of the third embodiment only needs to include the photosensitive member of the first embodiment. As described in the first embodiment, the photosensitive member of the first embodiment can exhibit sensitivity with reduced environmental dependence and inhibit occurrence of fogging in high-temperature and high-humidity environments. Consequently, the process cartridge of the third embodiment can exhibit sensitivity with reduced environmental dependence and inhibit occurrence of fogging in high-temperature and high-humidity environments.

The process cartridge of the third embodiment may further include at least one (e.g., at least 1 and no greater than 7) selected from the group consisting of a charger 63, a light exposure device 61, a development device 64, a transfer device 70 (particularly, a primary transfer roller 71), a cleaning member 661, a rubbing roller 662, and a static eliminator 67 in addition to an image bearing member 65. The process cartridge is designed to be freely attachable to and detachable from the image forming apparatus 100. In the above configuration, the process cartridge is easy to handle and can be quickly replaced with a new process cartridge including an image bearing member 65 if sensitivity characteristics or the like of the mounted image bearing member 65 are degraded. The process cartridge of the third embodiment has been described so far with reference to FIG. 3.

[Substituent]

The substituents used in the present specification are explained below. Examples of the halogen atom (halogen group) include a fluorine atom (fluoro group), a chlorine atom (chloro group), a bromine atom (bromo group), and an iodine atom (iodine group).

The alkyl groups each are an unsubstituted straight chain or branched chain alkyl group unless otherwise stated. Examples of the alkyl group with a carbon number of at least 1 and no greater than 8 include a methyl group, an ethyl group, an n-propyl group, an isopropyl group, an n-butyl group, a sec-butyl group, a tert-butyl group, an n-pentyl group, a 1-methylbutyl group, a 2-methylbutyl group, a 3-methylbutyl group, a 1-ethylpropyl group, a 2-ethylpropyl group, a 1,1-dimethylpropyl group, a 1,2-dimethylpropyl group, a 2,2-dimethylpropyl group, an n-hexyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 3,3-dimethylbutyl group, a 1,1,2-trimethylpropyl group, a 1,2,2-trimethylpropyl group, a 1-ethylbutyl group, a 2-ethylbutyl group, a 3-ethylbutyl group, a straight chain or branched chain heptyl group, and a straight chain or branched chain octyl group. Examples of the alkyl groups with different carbon numbers are those with the corresponding carbon numbers among the alkyl groups listed above.

The alkoxy groups each are an unsubstituted straight chain or branched chain alkoxy group unless otherwise stated. Examples of the alkoxy group with a carbon number of at least 1 and no greater than 6 include a methoxy group, an ethoxy group, an n-propoxy group, an isopropoxy group, an n-butoxy group, a sec-butoxy group, a tert-butoxy group, an n-pentoxy group, a 1-methylbutoxy group, a 2-methylbutoxy group, a 3-methylbutoxy group, a 1-ethylpropoxy group, a 2-ethylpropoxy group, a 1,1-dimethylpropoxy group, a 1,2-dimethylpropoxy group, a 2,2-dimethylpropoxy group, an n-hexyloxy group, a 1-methylpentyloxy group, a 2-methylpentyloxy group, a 3-methylpentyloxy group, a 4-methylpentyloxy group, a 1,1-dimethylbutoxy group, a 1,2-dimethylbutoxy group, a 1,3-dimethylbutoxy group, a 2,2-dimethylbutoxy group, a 2,3-dimethylbutoxy group, a 3,3-dimethylbutoxy group, a 1,1,2-trimethylpropoxy group, a 1,2,2-trimethylpropoxy group, a 1-ethylbutoxy group, a 2-ethylbutoxy group, and a 3-ethylbutoxy group. Examples of the alkoxy groups with different carbon numbers are those with the corresponding carbon numbers among the alkoxy groups listed above.

The aryl groups each are an unsubstituted aryl group unless otherwise stated. Examples of the aryl group with a carbon number of at least 6 and no greater than 14 include a phenyl group, a naphthyl group, an indacenyl group, a biphenylenyl group, an acenaphthylenyl group, an anthryl group, and a phenanthryl group. Examples of the aryl groups with different carbon numbers are those with the corresponding carbon numbers among the aryl groups listed above.

The alkenyl groups each are an unsubstituted straight chain or branched chain alkenyl group unless otherwise stated. The alkenyl group with a carbon number of at least 2 and no greater than 6 has at least 1 and no greater than 3 double bonds. Examples of the alkenyl group with a carbon number of at least 2 and no greater than 6 include an ethenyl group, a propenyl group, a butenyl group, a butadienyl group, a pentenyl group, a hexenyl group, a hexadienyl group, and a hexatrinyl group. The substituents used in the present specification have been explained so far.

EXAMPLES

The following describes the present disclosure further in detail using examples. However, the present disclosure is not limited to the scope of the examples.

[Inorganic Particles]

Inorganic particles (T1) to (T6) were prepared by combining surface treated titanium oxide particles and surface treatment agents as shown below in Table 1. Titanium oxide particles not subjected to surface treatment were used as inorganic particles (T7). Note that in Table 1 below, "MHPS" refers to methyl hydrogen polysiloxane. "Al oxide" refers to aluminum oxide. "Part" refers to parts by mass.

(Inorganic Particles (T1))

Surface treated titanium oxide particles (1) ("MTY-500SAS", product of TAYCA CORPORATION, number average primary particle diameter 35 nm) were used as the inorganic particles (T1). The inorganic particles (T1) each included a titanium oxide particle and a surface treatment layer covering at least a part of the surface of the titanium oxide particle. The surface treatment layers contained aluminum oxide, silica, and methyl hydrogen polysiloxane.

(Inorganic Particles (T2))

The inorganic particles (T2) were prepared by the following method. Surface treated titanium oxide particles (2) ("MT-05", product of TAYCA CORPORATION, number average primary particle diameter 10 nm) were prepared first. The surface treated titanium oxide particles (2) each included a titanium oxide particle and a surface treatment layer covering at least a part of the surface of the titanium oxide particle. The surface treatment layers contained aluminum oxide and silica. Next, 100 parts by mass of the surface treated titanium oxide particles (2), 500 parts by mass of toluene as a solvent, and 3 parts by mass of methyl hydrogen polysiloxane ("KF99", product of Shin-Etsu Chemical Co., Ltd.) as an organic siloxane compound were mixed and stirred to prepare a slurry. The slurry was heated under reduced pressure to distill the solvent off. Thus, the surface treated titanium oxide particles (2) were further surface treated with methyl hydrogen polysiloxane. As a result, the inorganic particles (T2) were obtained. The surface treatment layers of the inorganic particles (T2) contained aluminum oxide, silica, and methyl hydrogen polysiloxane. The inorganic particles (T2) had a number average primary particle diameter of 10 nm.

(Inorganic Particles (T3))

The inorganic particles (T3) were prepared according to the same method as that for preparing the inorganic particles (T2) in all aspects other than that the organic siloxane compound was changed to 3 parts by mass of dimethylpolysiloxane ("KF96", product of Shin-Etsu Chemical Co., Ltd.). The surface treatment layers of the inorganic particles (T3) contained aluminum oxide, silica, and dimethylpolysiloxane. The inorganic particles (T3) had a number average primary particle diameter of 10 nm.

(Inorganic Particles (T4))

In the preparation of the inorganic particles (T4), surface treated titanium oxide particles (3) ("MT-500SA", product of TAYCA CORPORATION, number average primary particle diameter 35 nm) were prepared first. The surface treated titanium oxide particles (3) each included a titanium oxide particle and a surface treatment layer covering at least a part of the surface of the titanium oxide particle. The surface treatment layers contained aluminum oxide and silica. The inorganic particles (T4) were prepared according to the same method as that for preparing the inorganic particles (T2) in all aspects other than that the surface treated titanium oxide particles (2) were changed to 100 parts by mass of the aforementioned surface treated titanium oxide particles (3). The surface treatment layers of the inorganic particles (T4) contained aluminum oxide, silica, and methyl hydrogen polysiloxane. The inorganic particles (T4) had a number average primary particle diameter of 35 nm.

(Inorganic Particles (T5))

In the preparation of the inorganic particles (T5), surface treated titanium oxide particles (4) ("MT-100WP", product of TAYCA CORPORATION, number average primary particle diameter 15 nm) were prepared first. The surface treated inorganic particles (4) each included a titanium oxide particle and a surface treatment layer covering at least a part of the surface of the titanium oxide particle. The surface treatment layers contained silica. The inorganic particles (T5) were prepared according to the same method as that for preparing the inorganic particles (T2) in all aspects other than that the surface treated titanium oxide particles (2) were changed to 100 parts by mass of the aforementioned surface treated titanium oxide particles (4). The surface treatment layers of the inorganic particles (T5) contained silica and methyl hydrogen polysiloxane. The inorganic particles (T5) had a number average primary particle diameter of 15 nm.

(Inorganic Particles (T6))

The inorganic particles (T6) were prepared according to the same method as that for preparing the inorganic particles (T2) in all aspects other than that the amount of methyl hydrogen polysiloxane used was changed from 3 parts by mass to 9 parts by mass. The surface treatment layers of the inorganic particles (T6) contained aluminum oxide, silica, and methyl hydrogen polysiloxane. The inorganic particles (T6) had a number average primary particle diameter of 10 nm.

(Inorganic Particles (T7))

Titanium oxide particles ("MT-500B", product of TAYCA CORPORATION, number average primary particle diameter 50 nm) not subjected to surface treatment were used as the inorganic particles (T7). The inorganic particles (T7) included no surface treatment layers.

TABLE 1

| | Surface treated titanium oxide particles | | | Surface treatment agent | | Particle diameter |
|---|---|---|---|---|---|---|
| | Type | Surface treatment layers | Part | Type | Part | [nm] |
| T1 | MTY-500SAS | Al oxide + silica + MHPS | 100 | — | — | 35 |
| T2 | MT-05 | Al oxide + silica | 100 | MHPS | 3 | 10 |
| T3 | MT-05 | Al oxide + silica | 100 | Dimethylpolysiloxane | 3 | 10 |
| T4 | MT-500SA | Al oxide + silica | 100 | MHPS | 3 | 35 |
| T5 | MT-100WP | Silica | 100 | MHPS | 3 | 15 |
| T6 | MT-05 | Al oxide + silica | 100 | MHPS | 9 | 10 |
| T7 | MT-500B | Untreated | 100 | — | — | 50 |

[Polyamide Resin]

Polyamide resins (A1) to (A7) formed with the monomers shown below in Table 2 were prepared in the manner described below. Note that the polyamide resins (A1) to (A4) each were the specific polyamide resin among the polyamide resins (A1) to (A7). The solubility of the polyamide resins (A1) to (A4) in ethanol was measured at 25° C. to found to be 10% by mass or higher.

(Polyamide Resin (A1))

A four-necked flask equipped with a stirrer, a thermometer, a nitrogen inlet tube, and a dewatering tube was used as a reaction vessel. The reaction vessel was charged with dodecanedioic acid (1 part by mole) as a dicarboxylic acid and isophoronediamine (1 part by mole) as a diamine. Next, the interior of the reaction vessel was purged with nitrogen under stirring of the contents of reaction vessel. The above state of the interior of the reaction vessel was maintained thereafter until reaction ended. Next, the contents of the reaction vessel was heated to 230° C. and allowed to react (dehydration condensation) at the temperature for 4 hours. After the reaction ended, the interior of the reaction vessel was reduced in pressure and held at 250° C. for 2 hours to dehydrate water produced by the reaction. Thereafter, the interior of the reaction vessel was returned to the normal temperature and the normal pressure. Thus, the polyamide resin (A1) was obtained.

(Polyamide Resins (A2) to (A6))

The polyamide resins (A2) to (A6) were prepared according to same method as that for preparing the polyamide resin (A1) in all aspects other than that the monomers used were changed to those shown below in Table 2. Note that dodecanedioic acid (0.35 parts by mole) as a dicarboxylic acid, isophoronediamine (0.35 parts by mole) as a diamine, and caprolactam (0.30 parts by mole) were used (rate of caprolactam in the total 100% by mol of all the monomers 30% by mol) as the monomers in the preparation of the polyamide resin (A5).

(Polyamide Resin (A7))

"AMILAN (registered Japanese trademark) CM8000" produced by Toray Industries, Inc. was prepared as the polyamide resin (A7). The polyamide resin (A7) was a copolymer of nylon 6, nylon 12, nylon 66, and nylon 610. The polyamide resin (A7) included neither the first repeating unit nor the second repeating unit.

(Viscosity Measurement)

An organic solvent mixture (methanol:n-butanol:toluene=3:1:1) was prepared by mixing 60 parts by mass of methanol, 20 parts by mass of n-butanol, and 20 parts by mass of toluene. An evaluation solution was prepared by mixing 85 parts by mass of the organic solvent mixture and 15 parts by mass of a polyamide resin (specifically, any of the polyamide resins (A1) to (A7)) being a measurement target. The viscosity of the evaluation solution was measured at 25° C. using a vibration type viscometer "VM-10A" produced by SEKONIC CORPORATION. The measurement results are shown below in Table 2. In Table 2 below, "MM" refers to 4,4-methylenebis-2-methylcyclohexylamine.

TABLE 2

| | Dicarboxylic acid | | | | |
|---|---|---|---|---|---|
| | Type | Carbon number | Diamine Type | Other Type | Viscosity [mPa · sec] |
| A1 | Dodecanedioic acid | 12 | Isophorondiamin | — | 120 |
| A2 | Decanedioic acid | 10 | Isophorondiamin | — | 112 |
| A3 | Octanedioic acid | 8 | Isophorondiamin | — | 115 |
| A4 | Dodecanedioic acid | 12 | MM | — | 125 |
| A5 | Dodecanedioic acid | 12 | Isophorondiamin | Caprolactam | 119 |
| A6 | Hexanedioic acid | 6 | Isophorondiamin | — | 129 |
| A7 | Copolymerized nylon | | | | 130 |

<Single-layer Photosensitive Member Production>

Photosensitive members of Examples 1 to 26 and Comparative Examples 1 to 4 each being a negatively chargeable single-layer photosensitive member were produced by the following methods.

Example 1

(Intermediate Layer Formation)

First, 3 parts by mass of the inorganic particles (T1), 1 part by mass of the polyamide resin (A1), 12 parts by mass of ethanol, 4 parts by mass of n-butanol, and 4 parts by mass of toluene were mixed. The resulting mixture was stirred for 10 hours using a bead mill to sufficiently disperse the inorganic particles (T1) in a solvent (organic solvent mixture of ethanol, n-butanol, and toluene). Thus, an application liquid for intermediate layer formation was prepared.

As a conductive substrate, an aluminum drum-shaped support (diameter 30 mm, length 244.5 mm) was used. The application liquid for intermediate layer formation was applied onto the conductive substrate by dip coating. Next, the conductive substrate after the application was heated and dried at 130° C. for 30 minutes. Thus, an intermediate layer (film thickness 2 μm) was formed on the conductive substrate.

(Single-Layer Photosensitive Member Formation)

A mixed liquid was obtained by mixing 3.0 parts by mass of Y-form titanyl phthalocyanine, 70.0 parts by mass of the hole transport material (HTM-1), 40.0 parts by mass of the electron transport material (ETM-1), 100.0 parts by mass of bisphenol Z polycarbonate resin ("PANLITE (registered Japanese trademark) TS2050", product of TEIJIN LIMITED, viscosity average molecular weight 50,000), 0.1 parts by mass of a silicone oil ("KF96-50cs", product of Shin-Etsu Chemical Co., Ltd., dimethyl silicone oil), and 760.0 parts by mass of tetrahydrofuran. Ultrasonic dispersion treatment was performed on the resulting mixed liquid for 20 minutes using a rod-shaped sonic oscillator to obtain an application liquid for single-layer photosensitive layer formation. Next, the application liquid for single-layer photosensitive layer formation was applied onto the intermediate layer on the conductive substrate by ring coating. The applied application liquid for single-layer photosensitive layer formation was dried at 130° C. for 30 minutes to form a single-layer photosensitive layer (film thickness 30 μm) on the intermediate layer. Thus, the photosensitive member of Example 1 was obtained.

Examples 2 to 26 and Comparative Examples 1 to 4

The photosensitive members of Examples 2 to 26 and Comparative Examples 1 to 4 were produced according to the same method as that for producing the photosensitive member of Example 1 in all aspects other than the following changes. In the production of the photosensitive members of Examples 2 to 26 and Comparative Examples 1 to 4, the types of inorganic particles and polyamide resin added to the application liquid for intermediate layer formation were changed to those shown below in Table 3. In the production of the photosensitive members of Examples 2 to 26 and Comparative Examples 1 to 4, the types of hole transport material and electron transport material added to the application liquid for single-layer photosensitive layer formation were changed to those shown below in Table 3.

The terms used below in Table 3 are as follows. Note that the same applies to the terms used below in Table 5 described later.

CGM: charge generating material

CGM-1: Y-form titanyl phthalocyanine

HTM: hole transport material
ETM: electron transport material
Resin 1: bisphenol Z polycarbonate resin ("PANLITE (registered Japanese trademark) TS2050", product of TEIJIN LIMITED, viscosity average molecular weight 50,000)

TABLE 3

| | Intermediate layer | | Photosensitive layer | | | |
|---|---|---|---|---|---|---|
| | Inorganic particles | Polyamide resin | CGM | HTM | ETM | Resin |
| Example 1 | T1 | A1 | CGM-1 | HTM-1 | ETM-1 | Resin 1 |
| Example 2 | T1 | A2 | CGM-1 | HTM-1 | ETM-1 | Resin 1 |
| Example 3 | T1 | A3 | CGM-1 | HTM-1 | ETM-1 | Resin 1 |
| Example 4 | T1 | A4 | CGM-1 | HTM-1 | ETM-1 | Resin 1 |
| Example 5 | T2 | A1 | CGM-1 | HTM-1 | ETM-1 | Resin 1 |
| Example 6 | T3 | A1 | CGM-1 | HTM-1 | ETM-1 | Resin1 |
| Example 7 | T4 | A1 | CGM-1 | HTM-1 | ETM-1 | Resin 1 |
| Example 8 | T5 | A1 | CGM-1 | HTM-1 | ETM-1 | Resin 1 |
| Example 9 | T6 | A1 | CGM-1 | HTM-1 | ETM-1 | Resin 1 |
| Example 10 | T1 | A1 | CGM-1 | HTM-2 | ETM-1 | Resin 1 |
| Example 11 | T1 | A1 | CGM-1 | HTM-3 | ETM-1 | Resin 1 |
| Example 12 | T1 | A1 | CGM-1 | HTM-4 | ETM-1 | Resin 1 |
| Example 13 | T1 | A1 | CGM-1 | HTM-5 | ETM-1 | Resin 1 |
| Example 14 | T1 | A1 | CGM-1 | HTM-6 | ETM-1 | Resin 1 |
| Example 15 | T1 | A1 | CGM-1 | HTM-7 | ETM-1 | Resin 1 |
| Example 16 | T1 | A1 | CGM-1 | HTM-8 | ETM-1 | Resin 1 |
| Example 17 | T1 | A1 | CGM-1 | HTM-9 | ETM-1 | Resin 1 |
| Example 18 | T1 | A1 | CGM-1 | HTM-10 | ETM-1 | Resin 1 |
| Example 19 | T1 | A1 | CGM-1 | HTM-11 | ETM-1 | Resin 1 |
| Example 20 | T1 | A1 | CGM-1 | HTM-1 | ETM-2 | Resin 1 |
| Example 21 | T1 | A1 | CGM-1 | HTM-1 | ETM-3 | Resin 1 |
| Example 22 | T1 | A1 | CGM-1 | HTM-1 | ETM-4 | Resin 1 |
| Example 23 | T1 | A1 | CGM-1 | HTM-1 | ETM-5 | Resin1 |
| Example 24 | T1 | A1 | CGM-1 | HTM-1 | ETM-6 | Resin1 |
| Example 25 | T1 | A1 | CGM-1 | HTM-1 | ETM-7 | Resin1 |
| Example 26 | T1 | A1 | CGM-1 | HTM-1 | ETM-8 | Resin1 |
| Comparative Example 1 | T7 | A1 | CGM-1 | HTM-1 | ETM-1 | Resin1 |
| Comparative Example 2 | T1 | A5 | CGM-1 | HTM-1 | ETM-1 | Resin1 |
| Comparative Example 3 | T1 | A6 | CGM-1 | HTM-1 | ETM-1 | Resin1 |
| Comparative Example 4 | T1 | A7 | CGM-1 | HTM-1 | ETM-1 | Resin1 |

<Evaluation of Single-Layer Photosensitive Members>

Environmental dependence of sensitivity and fogging in a high-temperature and high-humidity environment were evaluated for the photosensitive members of Examples 1 to 26 and Comparative Examples 1 to 4 by the following methods. Also, dispersion stability of the inorganic particles was checked for the application liquids for intermediate layer formation used in the production of the photosensitive members of Examples 1 to 26 and Comparative Examples 1 to 4. Evaluation results and check results are shown below in Table 4.

[Environmental Dependence of Sensitivity]

The sensitivity of each photosensitive member being a measurement target was measured using a drum sensitivity test device (product of GENTEC CO., LTD.) in an environment (LL environment) at a temperature of 10° C. and a relative humidity of 15%. In detail, the photosensitive member was charged using the drum sensitivity test device so that the surface potential of the photosensitive member reached +800 V. Next, the surface of the photosensitive member was irradiated with monochromatic light (wavelength 780 nm, optical energy 0.5 μJ/$cm^2$) taken out of light of a halogen lamp using a bandpass filter. At the time when 50 milliseconds had elapsed from the monochromatic light irradiation, the surface potential of the photosensitive member was measured. The measured surface potential was used as a post-exposure potential $V_L$(LL) (unit +V) in the LL environment. Next, measurement similar to the measurement of the post-exposure potential $V_L$(LL) in the LL environment was performed except that the LL environment (measurement conditions) was changed to an HH environment at a temperature of 30° C. and a relative humidity of 80%. The measured surface potential was used as a post-exposure potential $V_L$(HH) (unit +V) in the HH environment. By applying $V_L$(LL) and $V_L$(HH) to the following equation, $\Delta V_L$ was calculated. The lower the environmental dependence of sensitivity of a photosensitive member, the smaller the value $\Delta V_L$. Environmental dependence of sensitivity of each photosensitive member was rated according to the following criteria.

$$\Delta V_L = V_L(LL) - V_L(HH)$$

(Criteria of Environmental Dependence of Sensitivity)

A (good): $\Delta V_L$ of no greater than 40 (unit +V)

B (poor): $\Delta V_L$ of greater than 40 (unit +V)

[Dispersion Stability of Inorganic Particles]

Into a mayonnaise bottle with a capacity of 70 mL, 20 g of the application liquid for intermediate layer formation used in the production of any of the photosensitive members was added. The mayonnaise bottle was rotated for stirring at a speed of 90 rpm for 24 hours. Next, the particle size distribution of the inorganic particles contained in the application liquid for intermediate layer formation after the stirring was measured using a laser diffraction particle size distribution analyzer ("SALD-2300", product of SHIMADZU CORPORATION). A volume median diameter of the inorganic particles after the stirring was calculated based the result of the particle size distribution measurement. Dispersion stability of the inorganic particles was rated according to the following criteria.

(Criteria of Dispersion Stability of Inorganic Particles)

A (good): volume median diameter of inorganic particles after stirring of no greater than 1.0 μm B (poor): volume median diameter of inorganic particles after stirring of greater than 1.0 μm

[Fogging in High-Temperature and High-Humidity Environment]

A printer (ECOSYS (registered Japanese trademark) P2040dw", product of KYOCERA Document Solutions Japan Inc.) was used as an evaluation apparatus. A photosensitive member was removed from the evaluation apparatus and any of the photosensitive members being an evaluation target was fitted in its place. The developer supplied as standard with the aforementioned printer was used as a developer for evaluation. Using the evaluation apparatus, a gray image was formed on a printing paper sheet in an environment (HH environment) at a temperature of 30° C. and a relative humidity of 80%. The printing paper sheet on which the gray image has been formed was visually observed to check for the presence or absence of image defects that might be considered as fog. Fogging in the high-temperature and high-humidity environment was rated according to the following criteria.

(Criteria of Fogging in High-Temperature and High-Humidity Environment)

A (good): No fog was observed on printing paper sheet.

B (poor): Fog was observed on printing paper sheet.

TABLE 4

| | Environmental dependence of sensitivity | | Dispersion stability | | Fogging in HH |
|---|---|---|---|---|---|
| | $\Delta V_L$ [+V] | Rating | $D_{50}$ [μm] | Rating | environment |
| Example 1 | 35 | A | 0.49 | A | A |
| Example 2 | 37 | A | 0.51 | A | A |
| Example 3 | 39 | A | 0.52 | A | A |
| Example 4 | 36 | A | 0.51 | A | A |
| Example 5 | 31 | A | 0.54 | A | A |
| Example 6 | 33 | A | 0.44 | A | A |
| Example 7 | 35 | A | 0.45 | A | A |
| Example 8 | 36 | A | 0.50 | A | A |
| Example 9 | 39 | A | 0.40 | A | A |
| Example 10 | 35 | A | 0.49 | A | A |
| Example 11 | 34 | A | 0.49 | A | A |
| Example 12 | 35 | A | 0.49 | A | A |
| Example 13 | 38 | A | 0.49 | A | A |
| Example 14 | 38 | A | 0.49 | A | A |
| Example 15 | 39 | A | 0.49 | A | A |
| Example 16 | 37 | A | 0.49 | A | A |
| Example 17 | 37 | A | 0.49 | A | A |
| Example 18 | 36 | A | 0.49 | A | A |
| Example 19 | 36 | A | 0.49 | A | A |
| Example 20 | 35 | A | 0.49 | A | A |
| Example 21 | 35 | A | 0.49 | A | A |
| Example 22 | 38 | A | 0.49 | A | A |
| Example 23 | 37 | A | 0.49 | A | A |
| Example 24 | 36 | A | 0.49 | A | A |
| Example 25 | 38 | A | 0.49 | A | A |
| Example 26 | 38 | A | 0.49 | A | A |
| Comparative Example 1 | 50 | B | 35.95 | B | B |
| Comparative Example 2 | 46 | B | 1.01 | B | B |
| Comparative Example 3 | 52 | B | 1.98 | B | B |
| Comparative Example 4 | 63 | B | 1.40 | B | B |

<Multi-Layer Photosensitive Member Production>

Photosensitive members of Examples 27 to 45 and Comparative Examples 5 to 8 each being a positively chargeable multi-layer photosensitive member were produced by the following methods.

Example 27

(Intermediate Layer Formation)

An intermediate layer (film thickness 2 μm) was formed on a conductive substrate according to the same method as that for intermediate layer formation described in Example 1.

(Charge Generating Layer Formation)

A mixed liquid was obtained by mixing 1.5 parts by mass of Y-form titanyl phthalocyanine, 1.0 part by mass of polyvinyl acetal resin ("S-LEC (registered Japanese trademark) BX-5", product of SEKISUI CHEMICAL CO., LTD.) as the base resin for photosensitive layer use, 40.0 parts by mass of propylene glycol monomethyl ether, and 40.0 parts by mass of tetrahydrofuran. The resulting mixed liquid was subjected to dispersion treatment using a bead mill for 2 hours to obtain an application liquid for charge generating layer formation. Next, the application liquid for charge generating layer formation was applied onto the intermediate layer by dip coating. The applied application liquid for charge generating layer formation was dried at 50° C. for 5 minutes to form a charge generating layer (film thickness 0.3 μm) on the intermediate layer.

(Charge Transport Layer Formation)

An application liquid for charge transport layer formation was obtained by mixing 45.0 parts by mass of the hole transport material (HTM-1), 100.0 parts by mass of bisphenol Z polycarbonate resin ("PANLITE (registered Japanese trademark) TS2050", product of TEIJIN LIMITED, viscosity average molecular weight 50,000) as the binder resin for photosensitive layer use, 0.1 parts by mass of a silicone oil ("KF96-50cs", product of Shin-Etsu Chemical Co., Ltd., dimethyl silicone oil), and 700.0 parts by mass of tetrahydrofuran. Next, the application liquid for charge transport layer formation was applied onto the charge generating layer by dip coating. The applied application liquid for charge transport layer formation was dried at 130° C. for 30 minutes to form a charge transport layer (film thickness 30 μm) on the charge generating layer. Thus, the photosensitive member of Example 27 was obtained.

Examples 28 to 45 and Comparative Examples 5 to 8

The photosensitive members of Examples 28 to 45 and Comparative Examples 5 to 8 were produced according to the same method as that for producing the photosensitive member of Example 27 in all aspects other than the following changes. In the production of the photosensitive members of Examples 28 to 45 and Comparative Examples 5 to 8, the types of inorganic particles and polyamide resin added to the application liquid for intermediate layer formation were changed to those shown below in Table 5. Also in the production of the photosensitive members of Examples 28 to 45 and Comparative Examples 5 to 8, the type of hole transport material added to the application liquid for charge transport layer formation was changed to those shown below in Table 5.

The term below in Table 5 is as follows.

Resin 2: polyvinyl acetal resin ("S-LEC" (registered Japanese trademark) BX-5", product of SEKISUI CHEMICAL CO., LTD.)

TABLE 5

| | Intermediate layer | | Charge generating layer | | Charge transport layer | |
|---|---|---|---|---|---|---|
| | Inorganic particles | Polyamide resin | CGM | Resin | HTM | Resin |
| Example 27 | T1 | A1 | CGM-1 | Resin 2 | HTM-1 | Resin 1 |
| Example 28 | T1 | A2 | CGM-1 | Resin 2 | HTM-1 | Resin 1 |
| Example 29 | T1 | A3 | CGM-1 | Resin 2 | HTM-1 | Resin 1 |
| Example 30 | T1 | A4 | CGM-1 | Resin 2 | HTM-1 | Resin 1 |
| Example 31 | T2 | A1 | CGM-1 | Resin 2 | HTM-1 | Resin 1 |
| Example 32 | T3 | A1 | CGM-1 | Resin 2 | HTM-1 | Resin 1 |
| Example 33 | T4 | A1 | CGM-1 | Resin 2 | HTM-1 | Resin 1 |
| Example 34 | T5 | A1 | CGM-1 | Resin 2 | HTM-1 | Resin 1 |
| Example 35 | T6 | A1 | CGM-1 | Resin 2 | HTM-1 | Resin 1 |
| Example 36 | T1 | A1 | CGM-1 | Resin 2 | HTM-2 | Resin 1 |
| Example 37 | T1 | A1 | CGM-1 | Resin 2 | HTM-3 | Resin 1 |
| Example 38 | T1 | A1 | CGM-1 | Resin 2 | HTM-4 | Resin 1 |
| Example 39 | T1 | A1 | CGM-1 | Resin 2 | HTM-5 | Resin 1 |
| Example 40 | T1 | A1 | CGM-1 | Resin 2 | HTM-6 | Resin 1 |
| Example 41 | T1 | A1 | CGM-1 | Resin 2 | HTM-7 | Resin 1 |
| Example 42 | T1 | A1 | CGM-1 | Resin 2 | HTM-8 | Resin 1 |
| Example 43 | T1 | A1 | CGM-1 | Resin 2 | HTM-9 | Resin 1 |
| Example 44 | T1 | A1 | CGM-1 | Resin 2 | HTM-10 | Resin 1 |
| Example 45 | T1 | A1 | CGM-1 | Resin 2 | HTM-11 | Resin 1 |
| Comparative Example 5 | T7 | A1 | CGM-1 | Resin 2 | HTM-1 | Resin1 |
| Comparative Example 6 | T1 | A5 | CGM-1 | Resin 2 | HTM-1 | Resin 1 |
| Comparative Example 7 | T1 | A6 | CGM-1 | Resin 2 | HTM-1 | Resin 1 |
| Comparative Example 8 | T1 | A7 | CGM-1 | Resin 2 | HTM-1 | Resin 1 |

<Evaluation of Multi-Layer Photosensitive Members>

Environmental dependence of sensitivity and fogging in a high-temperature and high-humidity environment were evaluated for the photosensitive members of Examples 27 to 45 and Comparative Examples 5 to 8 by the following methods. Furthermore, dispersion stability of the inorganic particles of the application liquids for intermediate layer formation used in the production of the photosensitive members of Examples 27 to 45 and Comparative Examples 5 to 8 was checked according to the same method as that carried out for the application liquids for intermediate layer formation used in the production of the Examples 1 to 26 and Comparative Examples 1 to 4. Evaluation results and check results are shown below in Table 6.

[Environmental Dependence of Sensitivity]

The sensitivity of each photosensitive member being a measurement target was measured using a drum sensitivity test device (product of GENTEC CO., LTD.) in an environment (LL environment) at a temperature of 10° C. and a relative humidity of 15%. In detail, the photosensitive member was charged using the drum sensitivity test device so that the surface potential of the photosensitive member reached −700 V. Next, the surface of the photosensitive member was irradiated with monochromatic light (wavelength 780 nm, optical energy 0.5 μJ/cm$^2$) taken out of light of a halogen lamp using a bandpass filter. At the time when 50 milliseconds had elapsed from the monochromatic light irradiation, the surface potential of the photosensitive member was measured. The measured surface potential was used as a post-exposure potential $V_L$(LL) (unit +V) in the LL environment. Next, measurement similar to the measurement of the post-exposure potential $V_L$(LL) in the LL environment was performed, except that the LL environment (measurement conditions) was changed to an HH environment at a temperature of 30° C. and a relative humidity of 80%. The measured surface potential was used as a post-exposure potential $V_L$(HH) (unit −V) in the HH environment. By applying $V_L$(LL) and $V_L$(HH) to the following equation, $\Delta V_L$ was calculated. The lower the environmental dependence of sensitivity of a photosensitive member, the smaller the value $\Delta V_L$. Environmental dependence of sensitivity of each photosensitive member was rated according to the following criteria.

$$\Delta V_L = V_L(LL) - V_L(HH)$$

(Criteria of Environmental Dependence of Sensitivity)

A (good): $\Delta V_L$ of no greater than 45 (unit −V)

B (poor): $\Delta V_L$ of greater than 45 (unit −V)

[Fogging in High-Temperature and High-Humidity Environment]

Fogging in the high-temperature and high-humidity environment was evaluated for the photosensitive members of Examples 27 to 45 and Comparative Examples 5 to 8 according to the same method as that carried out on the photosensitive members of Examples 1 to 26 and Comparative Examples 1 to 4 in all aspect other than that the evaluation apparatus used was changed to a printer ("MULTIXPRESS SL-K4350LX", product of Samsung Electronics Co., Ltd.).

TABLE 6

| | Environmental dependence of sensitivity | | Dispersion stability | | Fogging in HH |
|---|---|---|---|---|---|
| | $\Delta V_L$ [−V] | Rating | $D_{50}$ [μm] | Rating | environment |
| Example 27 | 35 | A | 0.49 | A | A |
| Example 28 | 37 | A | 0.51 | A | A |
| Example 29 | 39 | A | 0.52 | A | A |
| Example 30 | 35 | A | 0.51 | A | A |
| Example 31 | 32 | A | 0.54 | A | A |
| Example 32 | 34 | A | 0.44 | A | A |
| Example 33 | 38 | A | 0.45 | A | A |
| Example 34 | 36 | A | 0.50 | A | A |
| Example 35 | 41 | A | 0.40 | A | A |
| Example 36 | 36 | A | 0.49 | A | A |
| Example 37 | 35 | A | 0.49 | A | A |
| Example 38 | 34 | A | 0.49 | A | A |
| Example 39 | 37 | A | 0.49 | A | A |
| Example 40 | 38 | A | 0.49 | A | A |
| Example 41 | 39 | A | 0.49 | A | A |
| Example 42 | 36 | A | 0.49 | A | A |
| Example 43 | 36 | A | 0.49 | A | A |
| Example 44 | 35 | A | 0.49 | A | A |
| Example 45 | 35 | A | 0.49 | A | A |
| Comparative Example 5 | 53 | B | 35.95 | B | B |
| Comparative Example 6 | 48 | B | 1.01 | B | B |
| Comparative Example 7 | 51 | B | 1.98 | B | B |
| Comparative Example 8 | 70 | B | 1.40 | B | B |

As shown in Tables 1 to 6, the photosensitive members of Examples 1 to 45 each included a conductive substrate, an intermediate layer provided on the conductive substrate, and a photosensitive layer provided on the intermediate layer. The intermediate layer contained a specific polyamide resin and specific inorganic particles. The specific inorganic particles each included a metal oxide particle and a surface treatment layer covering at least a part of the surface of the metal oxide particle. The surface treatment layers contained a component derived from an organic siloxane compound and at least one of aluminum oxide and silica. The specific polyamide resin included a first repeating unit derived from an aliphatic dicarboxylic acid with a carbon number of at least 8 and no greater than 20 and a second repeating unit derived from a diamine compound with a cycloalkane structure. The total percentage content of the first repeating unit and the second repeating unit to all repeating units included in the specific polyamide resin was at least 80% by mol.

The photosensitive members of Examples 1 to 45 each exhibited sensitivity with reduced environmental dependence and inhibited occurrence of fogging in the high-temperature and high-humidity environment. The photosensitive members of Examples 1 to 45 were each rated as good for dispersion stability of the inorganic particles in the application liquid for intermediate layer formation used in the production. Accordingly, the photosensitive members of Examples 1 to 45 are each determined to include an intermediate layer in which the inorganic particles are stably dispersed.

By contrast, in the photosensitive members of Comparative Examples 1 and 5, the inorganic particles used in the intermediate layer formation included no surface treatment layers. In the intermediate layer formation in each of the photosensitive members of Comparative Examples 2 to 4 and 6 to 8, a polyamide resin other than the specific polyamide resin was used. As a result, the inorganic particles were insufficiently dispersed in the application liquid for intermediate layer formation in each of the photosensitive members of Comparative Examples 1 to 8. That is, the photosensitive members of Comparative Examples 1 to 8 are each determined to include an intermediate layer in which the inorganic particles are unstably dispersed. Each of the photosensitive members of Comparative Examples 2 to 4 and 6 to 8 are determined to be highly hygroscopic due to their intermediate layers not containing the specific polyamide resin. Accordingly, the photosensitive members of Comparative Examples 1 to 8 were rated as poor for environmental dependence of sensitivity and fogging in the high-temperature and high-humidity environment.

What is claimed is:

1. An electrophotographic photosensitive member comprising:

a conductive substrate;

an intermediate layer provided on the conductive substrate; and a photosensitive layer provided on the intermediate layer, wherein the intermediate layer contains a specific polyamide resin and specific inorganic particles, the specific inorganic particles each include a metal oxide particle and a surface treatment layer covering at least a part of a surface of the metal oxide particle, the surface treatment layers contain a component derived from an organic siloxane compound and at least one of aluminum oxide and silica, the specific polyamide resin includes a first repeating unit derived from an aliphatic dicarboxylic acid with a carbon number of at least 8 and no greater than 20 and a second repeating unit derived from a diamine compound with a cycloalkane structure, and a total percentage content of the first repeating unit and the second repeating unit to all repeating units included in the specific polyamide resin is at least 80% by mol.

2. The electrophotographic photosensitive member according to claim 1, wherein the metal oxide particles are titanium oxide particles.

3. The electrophotographic photosensitive member according to claim 1, wherein the diamine compound with the cycloalkane structure includes isophoronediamine.

4. The electrophotographic photosensitive member according to claim 1, wherein the organic siloxane compound includes methylhydrogenpolysiloxane.

5. The electrophotographic photosensitive member according to claim 1, wherein the surface treatment layers contain only the aluminum oxide, the silica, and a component derived from the organic siloxane compound, or only the silica and a component derived from the organic siloxane compound.

6. The electrophotographic photosensitive member according to claim 1, wherein the specific polyamide resin does not include a repeating unit derived from an aromatic dicarboxylic acid.

7. The electrophotographic photosensitive member according to claim 1, wherein the intermediate layer has a thickness of at least 1 μm and no greater than 20 μm.

8. The electrophotographic photosensitive member according to claim 1, wherein the specific inorganic particles have a content of at least 50 parts by mass and no greater than 1000 parts by mass relative to 100 parts by mass of the specific polyamide resin in the intermediate layer.

9. The electrophotographic photosensitive member according to claim 1, wherein the specific inorganic particles have a number average primary particle diameter of at least 5 nm and no greater than 100 nm.

10. The electrophotographic photosensitive member according to claim 1, wherein the photosensitive layer is a single layer.

11. The electrophotographic photosensitive member according to claim 1, wherein the photosensitive layer includes a charge generating layer and a charge transport layer, the charge generating layer is provided on the intermediate layer, and the charge transport layer is provided on the charge generating layer.

12. A process cartridge comprising the electrophotographic photosensitive member according to claim 1.

13. An image forming apparatus comprising:

an image bearing member;

a charger that charges a surface of the image bearing member;

a light exposure device that exposes the charged surface of the image bearing member to light to form an electrostatic latent image on the surface of the image bearing member;

a development device that develops the electrostatic latent image into a toner image by supplying toner to the surface of the image bearing member; and a transfer device that transfers the toner image from the image bearing member to a transfer target, wherein the image bearing member is the electrophotographic photosensitive member according to claim 1.

* * * * *